United States Patent
Motoichi

(10) Patent No.: US 10,790,679 B2
(45) Date of Patent: Sep. 29, 2020

(54) BATTERY PROTECTION CIRCUIT AND DEVICE, BATTERY PACK, AND BATTERY PROTECTION METHOD

(71) Applicant: Yoshihiro Motoichi, Tokyo (JP)

(72) Inventor: Yoshihiro Motoichi, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 622 days.

(21) Appl. No.: 14/497,402

(22) Filed: Sep. 26, 2014

(65) Prior Publication Data

US 2016/0094065 A1   Mar. 31, 2016

(51) Int. Cl.
*H02J 7/00*   (2006.01)
*H02J 7/04*   (2006.01)
*H02J 7/06*   (2006.01)

(52) U.S. Cl.
CPC ............ *H02J 7/0021* (2013.01); *H02J 7/007* (2013.01); *H02J 7/0029* (2013.01);
(Continued)

(58) Field of Classification Search
CPC .................. H02J 7/00; H02J 2007/0039; H02J 2007/004; H02J 7/0006; H02J 7/0016;
(Continued)

(56) References Cited

U.S. PATENT DOCUMENTS 5,557,189 A * 9/1996 Suzuki .................. H01M 10/44
320/119

5,804,944 A * 9/1998 Alberkrack ............... H02J 7/00
320/163

(Continued)

FOREIGN PATENT DOCUMENTS

EP   2629392   8/2013
JP   2006-345660   12/2006
(Continued)

OTHER PUBLICATIONS

"MOSFET as a Switch—Electrical Engineering Stack", https://electronics.stackexchange.com/questions/18885/mosfet-as-a-switch-when-is-it-in-saturation, Electrical Engineering Stack.*
Japanese Office Action for 2013-179738 dated May 30, 2017.

*Primary Examiner* — John T Trischler
(74) *Attorney, Agent, or Firm* — IPUSA, PLLC

(57) ABSTRACT

A battery protection circuit that protects a rechargeable battery including cells connected in parallel includes an overcharging detection part provided for each of the cells and configured to prevent the corresponding cell from being charged in response to detecting overcharging of the corresponding cell, an overdischarge detection part provided for each of the cells and configured to prevent the corresponding cell from being discharged in response to detecting overdischarge of the corresponding cell, a charging current limiting part provided for each of the cells and configured to prevent a charging current from exceeding a predetermined charging current value during a period for which the charging current flows through the corresponding cell, and a discharge current limiting part provided for each of the cells and configured to prevent a discharge current from exceeding a predetermined discharge current value during a period for which the discharge current flows through the corresponding cell.

20 Claims, 7 Drawing Sheets

(52) U.S. Cl.
CPC .......... *H02J 7/0047* (2013.01); *H02J 7/0049* (2020.01); *H02J 7/00304* (2020.01); *H02J 7/00308* (2020.01); *H02J 7/04* (2013.01); *H02J 7/06* (2013.01); *H02J 7/0013* (2013.01); *H02J 7/00302* (2020.01); *H02J 7/00306* (2020.01)

(58) Field of Classification Search
CPC ...... H02J 7/0031; H02J 7/0018; H02J 7/0068; H02J 7/0013; H02J 7/0021; H02J 7/00308; H02J 7/00304; H02J 7/0049; H02J 7/0047; H02J 7/0029; H02J 7/007; H02J 7/04; H02J 7/06; H01M 10/4207
USPC .................... 320/126, 118, 134, 162, 163
See application file for complete search history.

(56) References Cited

U.S. PATENT DOCUMENTS

| | | | | | |
|---|---|---|---|---|---|
| 5,920,181 | A * | 7/1999 | Alberkrack | .......... | H02J 7/00711 320/146 |
| 6,605,925 | B2 * | 8/2003 | Tange | .................. | H02J 7/0031 320/134 |
| 7,449,891 | B2 * | 11/2008 | Cawthorne | .......... | B60W 10/26 324/427 |
| 7,463,008 | B2 * | 12/2008 | Takahashi | ............ | H02J 7/0022 320/118 |
| 7,629,769 | B2 * | 12/2009 | Gangstoe | ............. | H02J 7/0031 320/134 |
| 8,035,355 | B2 * | 10/2011 | Motoichi | ................. | H02J 7/00 320/164 |
| 8,217,628 | B2 * | 7/2012 | Yang | ..................... | H02J 7/0031 320/134 |
| 8,228,032 | B2 * | 7/2012 | Bai | ...................... | H02J 7/0016 320/118 |
| 8,450,976 | B2 * | 5/2013 | Lipcsei | ................ | H02J 7/0031 320/134 |
| 8,558,516 | B2 * | 10/2013 | Takahashi | ................. | H02J 7/00 320/158 |
| 9,343,912 | B2 * | 5/2016 | Suzuki | .................... | H02J 50/80 |
| 9,438,055 | B2 * | 9/2016 | Chen | ..................... | H02J 7/007 |
| 9,553,469 | B2 * | 1/2017 | Kageyama | ............ | H02J 7/0029 |
| 9,780,581 | B2 * | 10/2017 | Weissinger | ........... | H02J 7/0031 |
| 2005/0077877 | A1 * | 4/2005 | Cawthorne | ........... | B60W 10/26 320/128 |
| 2006/0284597 | A1 * | 12/2006 | Takahashi | ............. | H02J 7/0022 320/116 |
| 2009/0167247 | A1 * | 7/2009 | Bai | ....................... | H02J 7/0016 320/134 |
| 2009/0289605 | A1 * | 11/2009 | Takahashi | ................. | H02J 7/00 320/163 |
| 2009/0295334 | A1 * | 12/2009 | Yang | ..................... | H02J 7/0031 320/134 |
| 2009/0302805 | A1 * | 12/2009 | Motoichi | ................. | H02J 7/00 320/164 |
| 2009/0315520 | A1 * | 12/2009 | Nishiyama | ....... | G01R 19/16542 320/134 |
| 2010/0072950 | A1 * | 3/2010 | Tatebayashi | .......... | H02J 7/0021 320/134 |
| 2012/0098454 | A1 * | 4/2012 | Grotkowski | ....... | H05B 33/0815 315/246 |
| 2012/0105008 | A1 * | 5/2012 | Lipcsei | ................. | H02J 7/0031 320/134 |
| 2012/0293117 | A1 * | 11/2012 | Suzuki | .................. | H02J 7/0006 320/108 |
| 2013/0063090 | A1 * | 3/2013 | Takeshita | .............. | H02J 7/0031 320/126 |
| 2013/0098646 | A1 * | 4/2013 | Funabashi | ................. | B25F 5/00 173/2 |
| 2014/0117784 | A1 * | 5/2014 | Weissinger, Jr. | ...... | H02J 7/0045 307/150 |
| 2014/0203762 | A1 * | 7/2014 | Kato | .................... | H02J 7/00718 320/107 |
| 2015/0035494 | A1 * | 2/2015 | Suzuki | ................ | H01M 10/441 320/134 |
| 2015/0137769 | A1 * | 5/2015 | Chen | .................... | H02J 7/0052 320/157 |
| 2015/0171647 | A1 * | 6/2015 | Zhao | ..................... | H02J 7/0029 320/107 |
| 2018/0183247 | A1 * | 6/2018 | Yamauchi | ............. | H02J 7/0031 |
| 2018/0262023 | A1 * | 9/2018 | Li | ........................ | H01M 10/425 |
| 2019/0020074 | A1 * | 1/2019 | Motoichi | .............. | H02J 7/0026 |
| 2019/0181665 | A1 * | 6/2019 | Shibata | ................. | H02J 7/0026 |

FOREIGN PATENT DOCUMENTS

| | | |
|---|---|---|
| JP | 2013-059212 | 3/2013 |
| NO | 2013/076877 | 5/2013 |

\* cited by examiner

BATTERY PROTECTION CIRCUIT AND DEVICE, BATTERY PACK, AND BATTERY PROTECTION METHOD

CROSS-REFERENCE TO RELATED APPLICATION

This application is based upon Japanese Patent Application No. 2013-179738, filed on Aug. 30, 2013, the entire contents of which are incorporated herein by reference.

BACKGROUND OF THE INVENTION

1. Field of the Invention

The present invention relates to a technique for protecting a rechargeable battery including multiple cells connected in parallel.

2. Description of the Related Art

A technique for protecting a rechargeable battery including multiple cells connected in parallel is disclosed in, for example, Japanese Laid-Open Patent Application No. 2006-345660. The disclosed technique protects cells from an inrush current that flows from a cell of a higher potential difference to a cell of a lower potential difference.

SUMMARY OF THE INVENTION

According to an aspect of the present invention, a battery protection circuit that protects a rechargeable battery including a plurality of cells connected in parallel includes an overcharging detection part provided for each of the cells and configured to prevent the corresponding cell from being charged in response to detecting overcharging of the corresponding cell, an overdischarge detection part provided for each of the cells and configured to prevent the corresponding cell from being discharged in response to detecting overdischarge of the corresponding cell, a charging current limiting part provided for each of the cells and configured to prevent a charging current from exceeding a predetermined charging current value during a period for which the charging current flows through the corresponding cell, and a discharge current limiting part provided for each of the cells and configured to prevent a discharge current from exceeding a predetermined discharge current value during a period for which the discharge current flows through the corresponding cell.

According to an aspect of the present invention, a battery protection device that protects a rechargeable battery including a plurality of cells connected in parallel includes an overcharging detection part provided for each of the cells and configured to prevent the corresponding cell from being charged in response to detecting overcharging of the corresponding cell, an overdischarge detection part provided for each of the cells and configured to prevent the corresponding cell from being discharged in response to detecting overdischarge of the corresponding cell, a charging control device provided in a charging path of each of the cells and configured to interrupt the charging path of the corresponding cell when the overcharging detection part prevents the corresponding cell from being charged, a discharge control device provided in a discharge path of each of the cells and configured to interrupt the discharge path of the corresponding cell when the overdischarge detection part prevents the corresponding cell from being discharged, a charging current limiting part provided for each of the cells and configured to, by the charging control device, prevent a charging current from exceeding a predetermined charging current value during a period for which the charging current flows through the corresponding cell, and a discharge current limiting part provided for each of the cells and configured to, by the discharge control device, prevent a discharge current from exceeding a predetermined discharge current value during a period for which the discharge current flows through the corresponding cell.

According to an aspect of the present invention, a battery pack includes the battery protection device as set forth above and the rechargeable battery.

According to an aspect of the present invention, a battery protection method for protecting a rechargeable battery including a plurality of cells connected in parallel includes, with respect to each of the cells, preventing the cell from being charged in response to detecting overcharging with respect to the cell, with respect to each of the cells, preventing the cell from being discharged in response to detecting overdischarge with respect to the cell, with respect to each of the cells, performing such control as to prevent a charging current from exceeding a predetermined charging current value during a period for which the charging current flows through the cell, and with respect to each of the cells, performing such control as to prevent a discharge current from exceeding a predetermined discharge current value during a period for which the discharge current flows through the cell.

According to an aspect of the present invention, a battery protection circuit that protects a rechargeable battery including a plurality of cells connected in parallel includes a charging current limiting part provided for each of the cells and configured to prevent a charging current from exceeding a predetermined charging current value during a period for which the charging current flows through the corresponding cell, a charging overcurrent detection part provided for each of the cells and configured to prevent the corresponding cell from being charged in response to detecting a charging overcurrent of the corresponding cell, a discharge current limiting part provided for each of the cells and configured to prevent a discharge current from exceeding a predetermined discharge current value during a period for which the discharge current flows through the corresponding cell, a discharge overcurrent detection part provided for each of the cells and configured to prevent the corresponding cell from being discharged in response to detecting a discharge overcurrent of the corresponding cell, a charging control part configured to determine whether to limit an electric current by the charging current limiting part or stop the electric current by the charging overcurrent detection part in accordance with a potential difference between electrodes of a same polarity of the cells, and a discharge control part configured to determine whether to limit the electric current by the discharge current limiting part or stop the electric current by the discharge overcurrent detection part in accordance with the potential difference between the electrodes of the same polarity of the cells.

The object and advantages of the present invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

The above-described related-art technique only protects cells from an overcurrent in a direction from a cell of a higher potential difference to a cell of a lower potential difference. Therefore, there may be cases where a rechargeable battery including multiple cells connected in parallel is not sufficiently protected by the above-described related-art technique.

According to an aspect of the present invention, a battery protection circuit and device, a battery pack, and a battery protection method that strengthen the function of protecting a rechargeable battery including multiple cells connected in parallel are provided.

According to an aspect of the present invention, it is possible to strengthen the function of protecting a rechargeable battery including multiple cells connected in parallel.

A description is given below, with reference to the accompanying drawings, of embodiments of the present invention.

Figure 1:
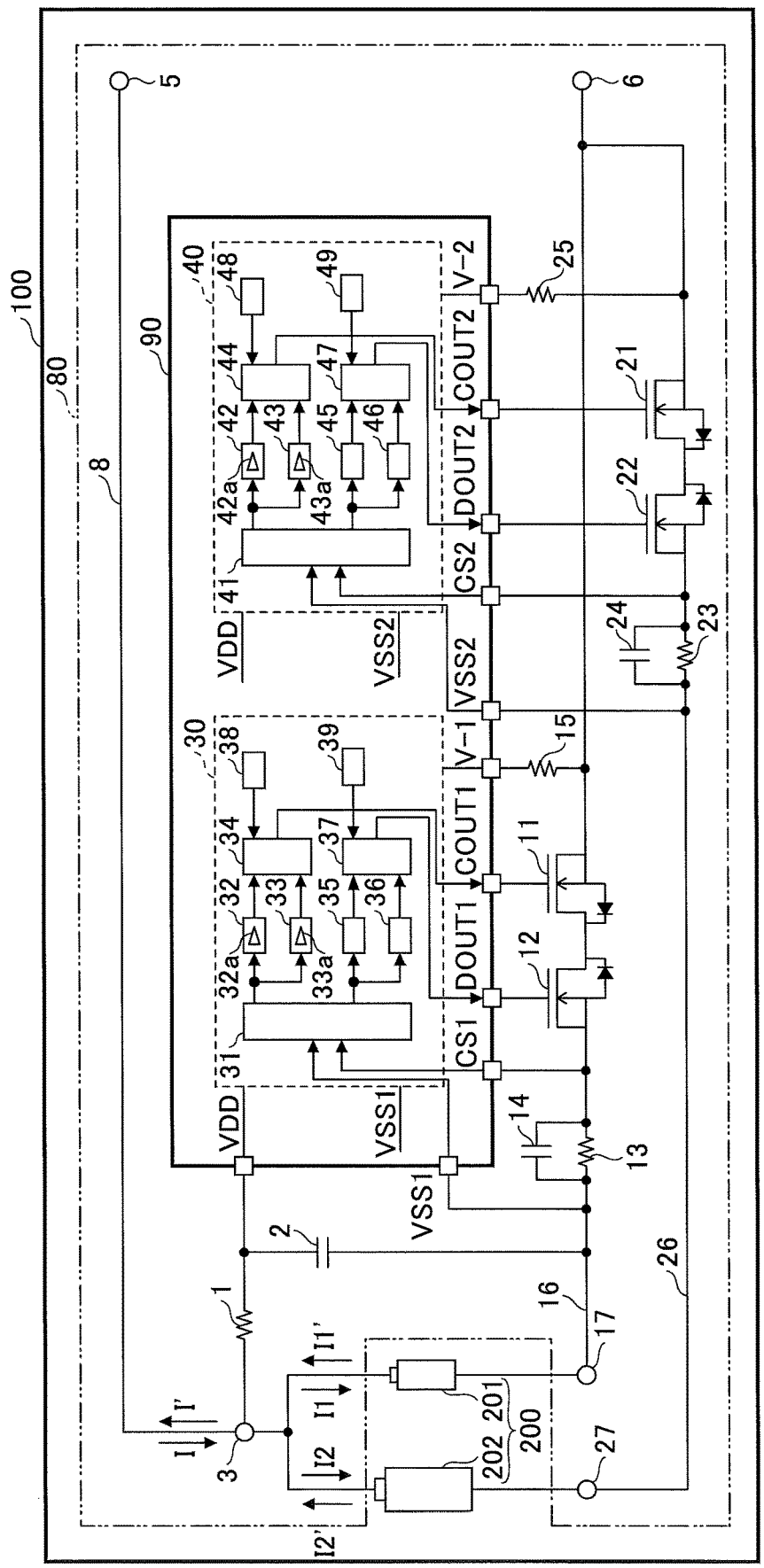
FIG. 1 is a diagram illustrating a configuration of a battery protection circuit.

FIG. 1 is a diagram illustrating a configuration of a battery pack 100 that is an embodiment of the present invention. The battery pack 100 includes a built-in rechargeable battery 200 and a built-in protection module 80 that protects the rechargeable battery 200. The rechargeable battery 200 is capable of supplying electric power to an external load (not illustrated in FIG. 1) connectable to load connection terminals 5 and 6. The battery pack 100 may be provided in or connected external to the external load. Examples of external loads include electronic devices such as portable terminals (cellular phones, portable game players, personal digital assistants [PDAs], mobile personal computers [PCs], smartphones, tablet terminals, portable music or video players, etc.), computers, headsets, and cameras.

The rechargeable battery 200 may be charged using a charger (not illustrated) connectable to the load connection terminals 5 and 6. Examples of the rechargeable battery 200 include a lithium ion battery and a nickel metal hydride battery. The rechargeable battery 200 is formed of two cells 201 and 202 connected in parallel to each other.

The protection module 80 includes the load connection terminals 5 and 6 and cell connection terminals 3, 17 and 27, and protects the rechargeable battery 200 connected to the cell connection terminals 3, 17 and 27 from an overcurrent. The cell connection terminal 5 is connected to the load connection terminal 5 via a power supply path 8. The cell connection terminal 17 is connected to the load connection terminal 6 via a power supply path 16. The cell connection terminal 27 is connected to the load connection terminal 6 via a power supply path 26. The cell connection terminal 3 is connected to the positive electrodes of both cells 201 and 202. The cell connection terminal 17 is connected to the negative electrode of the cell 201 without being connected to the negative electrode of the cell 202. The cell connection terminal 27 is connected to the negative electrode of the cell 202 without being connected to the negative electrode of the cell 201.

The protection module 80 includes transistors 11, 12, 21 and 22. The transistor 11 is a charging path interruption part capable of interrupting the charging path of the cell 201. The transistor 12 is a discharge path interruption part capable of interrupting the discharge path of the cell 201. The transistor 21 is a charging path interruption part capable of interrupting the charging path of the cell 202. The transistor 22 is a discharge path interruption part capable of interrupting the discharge path of the cell 202. In the case illustrated in FIG. 1, the transistor 11 is capable of interrupting the power supply path 16 through which a charging current of the cell 201 flows, and the transistor 12 is capable of interrupting the power supply path 16 through which the discharge current of the cell 201 flows. Furthermore, the transistor 21 is capable of interrupting the power supply path 26 through which a charging current of the cell 202 flows, and the transistor 22 is capable of interrupting the power supply path 26 through which the discharge current of the cell 202 flows.

The transistors 11 and 12 are switching devices capable of switching the conduction and interruption of the power supply path 16, and are inserted in series in the power supply path 16. The transistors 21 and 22 are switching devices capable of switching the conduction and interruption of the power supply path 26, and are inserted in series in the power supply path 26.

The transistors 11, 12, 21 and 22 are, for example, MOSFETs. The transistor 11 is inserted in the power supply path 16 so that the forward direction of the parasitic diode of the transistor 11 coincides with the discharge direction of the cell 201. The transistor 12 is inserted in the power supply path 16 so that the forward direction of the parasitic diode of the transistor 12 coincides with the charging direction of the cell 201. The transistor 21 is inserted in the power supply path 26 so that the forward direction of the parasitic diode of the transistor 21 coincides with the discharge direction of the cell 202. The transistor 22 is inserted in the power supply path 26 so that the forward direction of the parasitic diode of the transistor 22 coincides with the charging direction of the cell 202.

The transistors 11, 12, 21 and 22 may be other semiconductor devices such as IGBTs or bipolar transistors. Furthermore, a diode may be added between the drain and source (or the collector and emitter) of one or more of the transistors 11, 12, 21 and 22.

The protection module 80 includes resistors 13 and 23. The resistor 13 is a sense resistor for detecting the current value of a discharge current or a charging current flowing through the cell 201, and is inserted in series in the power supply path 16 between the cell connection terminal 17 and the transistors 11 and 12. The resistor 23 is a sense resistor for detecting the current value of a discharge current or a charging current flowing through the cell 202, and is inserted in series in the power supply path 26 between the cell connection terminal 27 and the transistors 21 and 22.

The protection module 80 includes capacitors 14 and 24. The capacitor 14 is connected in parallel to the resistor 13. Connecting the capacitor 14 in parallel to the resistor 13 improves the accuracy of current detection using the resistor 13. The capacitor 24 is connected in parallel to the resistor 23. Connecting the capacitor 24 in parallel to the resistor 23 improves the accuracy of current detection using the resistor 23.

The protection module 80 includes a protection IC 90. The protection IC 90 is an integrated circuit that is fed with electric power from the rechargeable battery 200 to protect the rechargeable battery 200. The protection IC 90 is formed of a single chip.

The protection IC 90 includes a VDD terminal, a VSS1 terminal, and a VSS2 terminal. The VDD terminal is a positive power supply terminal connected to the cell connection terminal 3 or the power supply path 8 via a resistor 1. The VSS1 terminal is a negative power supply terminal connected to the power supply path 16 between the cell connection terminal 17 and the resistor 13. The VSS2 terminal is a negative power supply terminal connected to the power supply path 26 between the cell connection terminal 27 and the resistor 23.

The resistor 1 is a current-limiting resistor that prevents an overcurrent from flowing to the VDD terminal. A capacitor 2 has one end connected between the resistor 1 and the VDD terminal and the other end connected to the power supply path 16 between the cell connection terminal 17 and the resistor 13. An RC low-pass filter formed of the resistor 1 and the capacitor 2 makes it possible to smooth the supply voltage between the VDD terminal and the VSS1 terminal.

The protection IC 90 includes a charging control circuit 34 capable of turning on the transistor 11 by outputting a high-level signal and turning off the transistor 11 by outputting a low-level signal from a COUT1 terminal of the protection IC 90. The charging control circuit 34 is capable of allowing an electric current in a direction to charge the cell 201 to flow through the power supply path 16 by turning on the transistor 11 and of preventing an electric current in a direction to charge the cell 201 from flowing through the power supply path 16 by turning off the transistor 11.

Furthermore, the protection IC 90 includes a discharge control circuit 37 capable of turning on the transistor 12 by outputting a high-level signal and turning off the transistor 12 by outputting a low-level signal from a DOUT1 terminal of the protection IC 90. The discharge control circuit 37 is capable of allowing an electric current in a direction to discharge the cell 201 to flow through the power supply path 16 by turning on the transistor 12 and of preventing an electric current in a direction to discharge the cell 201 from flowing through the power supply path 16 by turning off the transistor 12.

Likewise, the protection IC 90 includes a charging control circuit 44 capable of turning on the transistor 21 by outputting a high-level signal and turning off the transistor 21 by outputting a low-level signal from a COUT2 terminal of the protection IC 90. The charging control circuit 44 is capable of allowing an electric current in a direction to charge the cell 202 to flow through the power supply path 26 by turning on the transistor 21 and of preventing an electric current in a direction to charge the cell 202 from flowing through the power supply path 26 by turning off the transistor 21.

Furthermore, the protection IC 90 includes a discharge control circuit 47 capable of turning on the transistor 22 by outputting a high-level signal and turning off the transistor 22 by outputting a low-level signal from a DOUT2 terminal of the protection IC 90. The discharge control circuit 47 is capable of allowing an electric current in a direction to discharge the cell 202 to flow through the power supply path 26 by turning on the transistor 22 and of preventing an electric current in a direction to discharge the cell 202 from flowing through the power supply path 26 by turning off the transistor 22.

The protection module 80 is an example of a battery protection device that protects a rechargeable battery including multiple cells connected in parallel. The protection module 80 includes the protection IC 90 that includes protection control parts. The protection control parts are provided one for each of the cells forming the rechargeable battery, and control protection of the corresponding cells. A protection control circuit 30 is an example of a protection control circuit that is provided for the cell 201 and controls protection of the cell 201. A protection control circuit 40 is an example of a protection control circuit that is provided for the cell 202 and controls protection of the cell 202.

The protection control circuit 30 includes a current detection circuit 31, a charging overcurrent detection circuit 32, a charging current limiting circuit 33, the charging control circuit 34, a discharge overcurrent detection circuit 35, a discharge current limiting circuit 36, the discharge control circuit 37, an overcharging detection circuit 38, and an overdischarge detection circuit 39. The protection control circuit 40 includes a current detection circuit 41, a charging overcurrent detection circuit 42, a charging current limiting circuit 43, the charging control circuit 44, a discharge overcurrent detection circuit 45, a discharge current limiting circuit 46, the discharge control circuit 47, an overcharging detection circuit 48, and an overdischarge detection circuit 49.

The protection module 80 includes the protection IC 90 that includes charging current limiting parts provided one for each of cells forming a rechargeable battery and discharge current limiting parts provided one for each of the cells forming the rechargeable battery.

The charging current limiting circuit 33 is an example of a charging current limiting part provided for the cell 201, and the discharge current limiting circuit 36 is an example of a discharge current limiting part provided for the cell 201. The charging current limiting circuit 33 and the discharge current limiting circuit 36 operate with the voltage between the VDD terminal and the VSS1 terminal or a CS1 terminal serving as supply voltage. Likewise, the charging current limiting circuit 43 is an example of a charging current limiting part provided for the cell 202, and the discharge current limiting circuit 46 is an example of a discharge current limiting part provided for the cell 202. The charging current limiting circuit 43 and the discharge current limiting circuit 46 operate with the voltage between the VDD terminal and the VSS2 terminal or a CS2 terminal serving as supply voltage.

Furthermore, the protection module 80 includes charging control devices provided one in each of the charging paths of cells forming a rechargeable battery, and discharge control devices provided one in each of the discharge paths of the cells forming the rechargeable battery.

The transistor 11 is an example of a charging control device provided in the power supply path 16 that is the charging path of the cell 201. The transistor 12 is an example of a discharge control device provided in the power supply path 16 that is the discharge path of the cell 201. Likewise, the transistor 21 is an example of a charging control device provided in the power supply path 26 that is the charging path of the cell 202. The transistor 22 is an example of a discharge control device provided in the power supply path 26 that is the discharge path of the cell 202.

The charging current limiting circuit 33 performs charging current limiting control, that is, by controlling the ON-state of the transistor 11, prevents a charging current I1 from exceeding a predetermined charging current value Icth1 during a charging period for which the charging current I1 flows through the cell 201 corresponding to the charging current limiting circuit 33. The transistor 11 is a charging current limiting device that prevents the charging current I1 from exceeding the charging current value Icth1 during the charging period for which the charging current I1 flows by the charging current limiting control of the charging current limiting circuit 33. The transistor 11 is capable of limiting the flow of the charging current I1 flowing in the charging direction of the cell 201, and the charging current limiting circuit 33 causes the transistor 11 to operate in the ON-state in such a manner as to limit the flow of the charging current I1.

Figure 5:
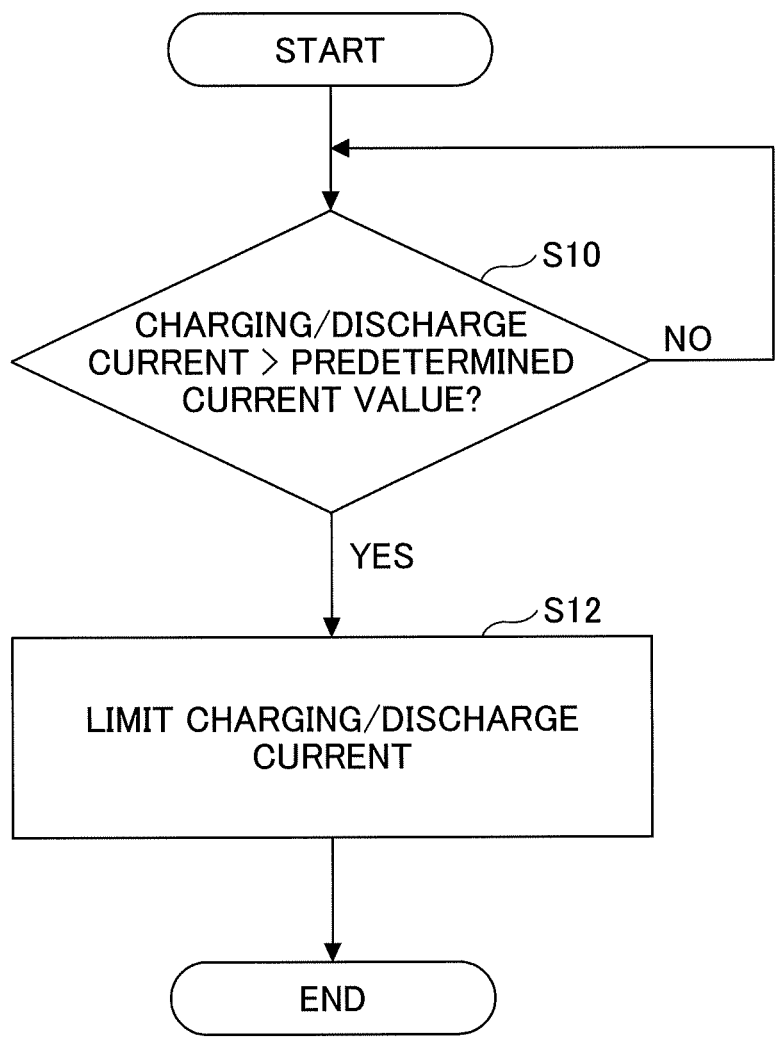
FIG. 5 is a flowchart illustrating an example of charging/discharge current limiting control according to a battery protection method.

Accordingly, even when the charging current I1 increases to reach the charging current value Icth1 (YES at step S10 of FIG. 5), the charging current limiting circuit 33 is capable of causing the charging current I1 to continue to flow at a current value greater than zero while limiting the flow of the charging current I1 so as to prevent the charging current I1 from exceeding the charging current value Icth1 (step S12 of FIG. 5).

Likewise, the charging current limiting circuit 43 performs charging current limiting control, that is, by controlling the ON-state of the transistor 21, prevents a charging current I2 from exceeding a predetermined charging current value Icth2 during a charging period for which the charging current I2 flows through the cell 202 corresponding to the charging current limiting circuit 43. The transistor 21 is a charging current limiting device that prevents the charging current I2 from exceeding the charging current value Icth2 during the charging period for which the charging current I2 flows by the charging current limiting control of the charging current limiting circuit 43. The transistor 21 is capable of limiting the flow of the charging current I2 flowing in the charging direction of the cell 202, and the charging current limiting circuit 43 causes the transistor 21 to operate in the ON-state in such a manner as to limit the flow of the charging current I2.

Accordingly, even when the charging current I2 increases to reach the charging current value Icth2, the charging current limiting circuit 43 is capable of causing the charging current I2 to continue to flow at a current value greater than zero while limiting the flow of the charging current I2 so as to prevent the charging current I2 from exceeding the charging current value Icth2.

A charging current I that flows through the power supply path 8 is the sum of the charging current I1, which flows through the cell 201 and the power supply path 16, and the charging current I2, which flows through the cell 202 and the power supply path 26. Furthermore, the charging current value Icth1 and the charging current value Icth2 may be the same or different.

Thus, by limiting the charging current I1 or I2 by a predetermined charging current value, it is possible to prevent an excessive charging/discharge current from flowing between the cells 201 and 202 even when the cells 201 and 202 have different capacities. Furthermore, because it is possible to connect multiple cells having different capacities from each other in parallel, it is possible to efficiently use a limited mounting area. For example, the volume of a cell decreases as the capacity of the cell decreases. Therefore, of the multiple cells, those having relatively low capacities can be provided in gaps on a board on which the multiple cells are to be mounted.

Furthermore, by thus limiting the charging current I1 or I2 by a predetermined charging current value, it is possible to prevent an excessive charging/discharge current from flowing between the cells 201 and 202 even when there is a large voltage difference between the cells 201 and 202 when the cells 201 and 202 are connected. Furthermore, by limiting the charging current I1 or I2 by a predetermined charging current value, it is possible to prevent, even when any cell is fully charged, an excessive charging current from flowing to the remaining cell(s). Furthermore, by limiting the charging current I1 or I2 by a predetermined charging current value, it is possible to prevent, even when the internal impedance of any of cells increases because of the degradation of the cell, an excessive charging current from flowing to the remaining cell(s).

The charging current limiting circuit 33 is capable of controlling the gate-source voltage value of the transistor 11 by controlling the voltage value between the COUT1 terminal and a V-1 terminal of the protection IC 90. Therefore, the charging current limiting circuit 33 is capable of limiting the charging current I1 while increasing or decreasing the current value of the charging current I1. The COUT1 terminal is connected to the gate of the transistor 11, and the V-1 terminal is connected to the source of the transistor 11 via a resistor 15. Likewise, the charging current limiting circuit 43 is capable of controlling the gate-source voltage value of the transistor 21 by controlling the voltage value between the COUT2 terminal and a V-2 terminal of the protection IC 90. Therefore, the charging current limiting circuit 43 is capable of limiting the charging current I2 while increasing or decreasing the current value of the charging current I2. The COUT2 terminal is connected to the gate of the transistor 21, and the V-2 terminal is connected to the source of the transistor 21 via a resistor 25.

On the other hand, the discharge current limiting circuit 36 performs discharge current limiting control, that is, by controlling the ON-state of the transistor 12, prevents a discharge current I1' (a current opposite in direction to the charging current I1) from exceeding a predetermined discharge current value Idth1 during a discharge period for which the discharge current I1' flows through the cell 201 corresponding to the discharge current limiting circuit 36. The transistor 12 is a discharge current limiting device that prevents the discharge current I1' from exceeding the discharge current value Idth1 during the discharge period for which the discharge current I1' flows by the discharge current limiting control of the discharge current limiting circuit 36. The transistor 12 is capable of limiting the flow of the discharge current I1' flowing in the discharge direction of the cell 201, and the discharge current limiting circuit 36 causes the transistor 12 to operate in the ON-state in such a manner as to limit the flow of the discharge current I1'.

Accordingly, even when the discharge current I1' increases to reach the discharge current value Idth1 (YES at step S10 of FIG. 5), the discharge current limiting circuit 36 is capable of causing the discharge current I1' to continue to flow at a current value greater than zero while limiting the flow of the discharge current I1' so as to prevent the discharge current I1' from exceeding the discharge current value Idth1 (step S12 of FIG. 5).

Likewise, the discharge current limiting circuit 46 performs discharge current limiting control, that is, by controlling the ON-state of the transistor 22, prevents a discharge current I2' (a current opposite in direction to the charging current I2) from exceeding a predetermined discharge current value Idth2 during a discharge period for which the discharge current I2' flows through the cell 202 corresponding to the discharge current limiting circuit 46. The transistor 22 is a discharge current limiting device that prevents the discharge current I2' from exceeding the discharge current value Idth2 during the discharge period for which the discharge current I2' flows by the discharge current limiting control of the discharge current limiting circuit 46. The transistor 22 is capable of limiting the flow of the discharge current I2' flowing in the discharge direction of the cell 202, and the discharge current limiting circuit 46 causes the transistor 22 to operate in the ON-state in such a manner as to limit the flow of the discharge current I2'.

Accordingly, even when the discharge current I2' increases to reach the discharge current value Idth2, the discharge current limiting circuit 46 is capable of causing the discharge current I2' to continue to flow at a current value greater than zero while limiting the flow of the discharge current I2' so as to prevent the discharge current I2' from exceeding the discharge current value Idth2.

A discharge current I' (a current opposite in direction to the charging current I) that flows through the power supply path 8 is the sum of the discharge current I1', which flows through the cell 201 and the power supply path 16, and the discharge current I2', which flows through the cell 202 and the power supply path 26. Furthermore, the discharge current value Idth1 and the discharge current value Idth2 may be the same or different.

Thus, by limiting the discharge current I1' or I2' by a predetermined discharge current value, it is possible to prevent an excessive charging/discharge current from flowing between the cells 201 and 202 even when the cells 201 and 202 have different capacities. Furthermore, because it is possible to connect multiple cells having different capacities from each other in parallel, it is possible to efficiently use a limited mounting area. For example, the volume of a cell decreases as the capacity of the cell decreases. Therefore, of the multiple cells, those having relatively low capacities can be provided in gaps on a board on which the multiple cells are to be mounted.

Furthermore, by thus limiting the discharge current I1' or I2' by a predetermined discharge current value, it is possible to prevent an excessive charging/discharge current from flowing between the cells 201 and 202 even when there is a large voltage difference between the cells 201 and 202 when the cells 201 and 202 are connected. In particular, in combination with the above-described function of limiting the charging current I1 or I2 by a predetermined charging current value, it is possible to more quickly prevent an excessive charging/discharge current from flowing between the cells 201 and 202.

Furthermore, by limiting the discharge current I1' or I2' by a predetermined discharge current value, it is possible to prevent an excessive load current from flowing via the power supply path 8 to a load connected to the load connecting terminal 5.

The discharge current limiting circuit 36 is capable of controlling the gate-source voltage value of the transistor 12 by controlling the voltage value between the DOUT1 terminal and the VSS1 terminal or the CS1 terminal of the protection IC 90. Therefore, the discharge current limiting circuit 36 is capable of limiting the discharge current I1' while increasing or decreasing the current value of the discharge current I1'. The DOUT1 terminal is connected to the gate of the transistor 12, the VSS1 terminal is connected to the source of the transistor 12 via the resistor 13, and the CS1 terminal is connected to the source of the transistor 12 without going through the resistor 13. Likewise, the discharge current limiting circuit 46 is capable of controlling the gate-source voltage value of the transistor 22 by controlling the voltage value between the DOUT2 terminal and the VSS2 terminal or the CS2 terminal of the protection IC 90. Therefore, the discharge current limiting circuit 46 is capable of limiting the discharge current I2' while increasing or decreasing the current value of the discharge current I2'. The DOUT2 terminal is connected to the gate of the transistor 22, the VSS2 terminal is connected to the source of the transistor 22 via the resistor 23, and the CS2 terminal is connected to the source of the transistor 22 without going through the resistor 23.

The charging current limiting circuit 33 performs charging current increasing control, that is, allows the charging current I1 to increase to a value lower than the charging current value Icth1 by changing the control voltage of the transistor 11 to a higher value, when a detected value of the charging current I1 is smaller than the charging current value Icth1. On the other hand, when a detected value of the charging current I1 is greater than the charging current value Icth1, the charging current limiting circuit 33 performs charging current decreasing control, that is, decreases the current value of the charging current I1 by changing the control voltage of the transistor 11 to a lower value. When the transistor 11 is a MOSFET, the control voltage of the transistor 11 corresponds to the gate-source voltage of the transistor 11.

By performing the charging current increasing control and the charging current decreasing control, the charging current limiting circuit 33 is capable of stably approximating the current value of the charging current I1 to the charging current value Icth1 even when the charging current I1 increases. In particular, by periodically performing the charging current increasing control and the charging current decreasing control, the charging current limiting circuit 33 is capable of more stably converging the current value of the charging current I1 to the charging current value Icth1 even when the charging current I1 increases.

The charging current limiting circuit 43 also is capable of stably approximating the current value of the charging current I2 to the charging current value Icth2 by performing the same control.

The discharge current limiting circuit 36 performs discharge current increasing control, that is, allows the discharge current I1' to increase to a value lower than the discharge current value Idth1 by changing the control voltage of the transistor 12 to a higher value, when a detected value of the discharge current I1' is smaller than the discharge current value Idth1. On the other hand, when a detected value of the discharge current I1' is greater than the discharge current value Idth1, the discharge current limiting circuit 36 performs discharge current decreasing control, that is, decreases the current value of the discharge current I1' by changing the control voltage of the transistor 12 to a lower value. When the transistor 12 is a MOSFET, the control voltage of the transistor 12 corresponds to the gate-source voltage of the transistor 12.

By performing the discharge current increasing control and the discharge current decreasing control, the discharge current limiting circuit 36 is capable of stably approximating the current value of the discharge current I1' to the discharge current value Idth1 even when the discharge current I1' increases. In particular, by periodically performing the discharge current increasing control and the discharge current decreasing control, the discharge current limiting circuit 36 is capable of more stably converging the current value of the discharge current I1' to the discharge current value Idth1 even when the discharge current I1' increases.

The discharge current limiting circuit 46 also is capable of stably approximating the current value of the discharge current I2' to the discharge current value Idth2 by performing the same control.

It is possible to obtain a detected value of the charging current I1 or a detected value of the discharge current I1' by detecting the voltage between the VSS1 terminal and the CS1 terminal of the protection IC 90 by the current detection circuit 31 of the protection IC 90. The current detection circuit 31 is capable of obtaining a detected value of the charging current I1 or a detected value of the discharge current I1' by, for example, measuring the voltage across the resistor 13 and the direction of an electric current flowing through the resistor 13. The VSS1 terminal is connected to the power supply path 16 between the cell connection terminal 17 and one end of the resistor 13. The CS1 terminal is connected to the power supply path 16 between the other end of the resistor 13 and the transistors 11 and 12.

Likewise, it is possible to obtain a detected value of the charging current I2 or a detected value of the discharge current I2' by detecting the voltage between the VSS2 terminal and the CS2 terminal of the protection IC 90 by the current detection circuit 41 of the protection IC 90. The current detection circuit 41 is capable of obtaining a detected value of the charging current I2 or a detected value of the discharge current I2' by, for example, measuring the voltage across the resistor 23 and the direction of an electric current flowing through the resistor 23. The VSS2 terminal is connected to the power supply path 26 between the cell connection terminal 27 and one end of the resistor 23. The CS2 terminal is connected to the power supply path 26 between the other end of the resistor 23 and the transistors 21 and 22.

The current detection circuit 31 is an example of a current detection part provided for the cell 201. The current detection circuit 31 operates with the voltage between the VDD terminal and the VSS1 terminal or the CS1 terminal serving as supply voltage. Likewise, the current detection circuit 41 is an example of a current detection part provided for the cell 202. The current detection circuit 41 operates with the voltage between the VDD terminal and the VSS2 terminal or the CS2 terminal serving as supply voltage.

The protection module 80 includes the protection IC 90 that includes charging overcurrent detection parts provided one for each of cells forming a rechargeable battery. The charging overcurrent detection circuit 32 is an example of a charging overcurrent detection part provided for the cell 201. The charging overcurrent detection circuit 42 is an example of a charging overcurrent detection part provided for the cell 202.

Figure 6:
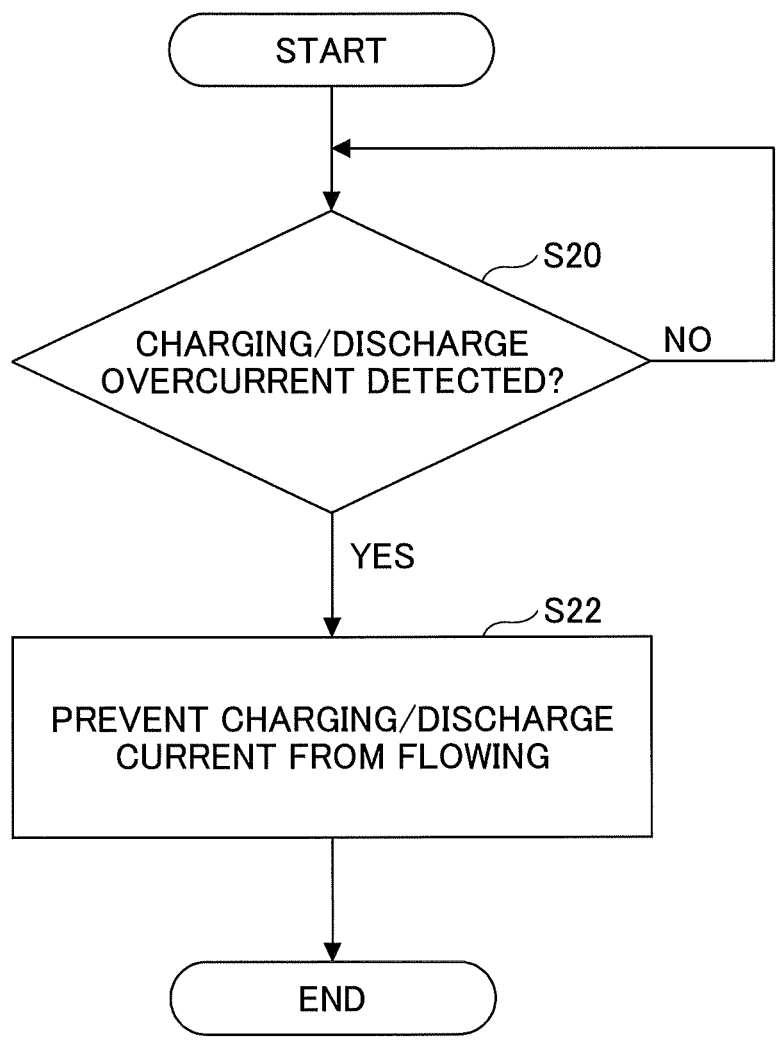
FIG. 6 is a flowchart illustrating an example of charging/discharge over current detection according to the battery protection method.

The charging overcurrent detection circuit 32 determines that an overcurrent (a charging overcurrent) in a direction to charge the cell 201 is detected in response to obtaining a detected value of the charging current I1 greater than or equal to a predetermined first charging overcurrent detection threshold from the current detection circuit 31. When the charging overcurrent of the cell 201 is detected (YES at step S20 of FIG. 6), the charging overcurrent detection circuit 32 prevents the charging current I1 from flowing through the cell 201 (step S22 of FIG. 6). In the case of preventing the charging current I1 from flowing through the cell 201, the charging overcurrent detection circuit 32 outputs a charge inhibit signal.

The charging overcurrent detection circuit 42 is the same circuit as the charging overcurrent detection circuit 32. In response to obtaining a detected value of the charging current I2 greater than or equal to a predetermined second charging overcurrent detection threshold from the current detection circuit 41, the charging overcurrent detection circuit 42 outputs a charge inhibit signal to prevent the charging current I2 from flowing through the cell 202.

The first charging overcurrent detection threshold and the second charging overcurrent detection threshold may be the same value or different values.

The protection module 80 includes the protection IC 90 that includes discharge overcurrent detection parts provided one for each of cells forming a rechargeable battery. The discharge overcurrent detection circuit 35 is an example of a discharge overcurrent detection part provided for the cell 201. The discharge overcurrent detection circuit 45 is an example of a discharge overcurrent detection part provided for the cell 202.

The discharge overcurrent detection circuit 35 determines that an overcurrent (a discharge overcurrent) in a direction to discharge the cell 201 is detected in response to obtaining a detected value of the discharge current I1' greater than or equal to a predetermined first discharge overcurrent detection threshold from the current detection circuit 31. When the discharge overcurrent of the cell 201 is detected (YES at step S20 of FIG. 6), the discharge overcurrent detection circuit 35 prevents the discharge current I1' from flowing through the cell 201 (step S22 of FIG. 6). In the case of preventing the discharge current I1' from flowing through the cell 201, the discharge overcurrent detection circuit 35 outputs a discharge inhibit signal.

The discharge overcurrent detection circuit 45 is the same circuit as the discharge overcurrent detection circuit 35. In response to obtaining a detected value of the discharge current I2' greater than or equal to a predetermined second discharge overcurrent detection threshold from the current detection circuit 41, the discharge overcurrent detection circuit 45 outputs a discharge inhibit signal to prevent the discharge current I2' from flowing through the cell 202.

The first discharge overcurrent detection threshold and the second discharge overcurrent detection threshold may be the same value or different values.

The protection module 80 includes the protection IC 90 that includes overcharging detection parts provided one for each of cells forming a rechargeable battery. The overcharging detection circuit 38 is an example of an overcharging detection part provided for the cell 201. The overcharging detection circuit 48 is an example of an overcharging detection part provided for the cell 202.

The overcharging detection circuit 38 is a charging overvoltage detection circuit that determines that overcharging is detected with respect to the cell 201 by detecting a cell voltage higher than or equal to a predetermined first overcharging detection threshold with respect to the cell 201. The overcharging detection circuit 38 prevents the cell 201 from being charged in response to detection of overcharging with respect to the cell 201. The overcharging detection circuit 38 outputs a charge inhibit signal in response to preventing the cell 201 from being charged.

The overcharging detection circuit 48 is the same circuit as the overcharging detection circuit 38. The overcharging detection circuit 48 prevents the cell 202 from being charged and outputs a charge inhibit signal in response to detection of a cell voltage higher than or equal to a predetermined second overcharging detection threshold with respect to the cell 202.

The first overcharging detection threshold and the second overcharging detection threshold may be the same value or different values.

The protection module 80 includes the protection IC that includes overdischarge detection parts one provided for each of cells forming a rechargeable battery. The overdischarge detection circuit 39 is an example of an overdischarge detection part provided for the cell 201. The overdischarge detection circuit 49 is an example of an overdischarge detection part provided for the cell 202.

The overdischarge detection circuit 39 is a discharge overvoltage detection circuit that determines that overdischarge is detected with respect to the cell 201 by detecting a cell voltage lower than or equal to a predetermined first overdischarge detection threshold with respect to the cell 201. The overdischarge detection circuit 39 prevents the cell 201 from being discharged in response to detection of overdischarge with respect to the cell 201. The overdischarge detection circuit 39 outputs a discharge inhibit signal in response to preventing the cell 201 from being discharged.

The overdischarge detection circuit 49 is the same circuit as the overdischarge detection circuit 39. The overdischarge detection circuit 49 prevents the cell 202 from being discharged and outputs a discharge inhibit signal in response to detection of a cell voltage lower than or equal to a predetermined second overdischarge detection threshold with respect to the cell 202.

The first overdischarge detection threshold and the second overdischarge detection threshold may be the same value or different values.

Figure 7:
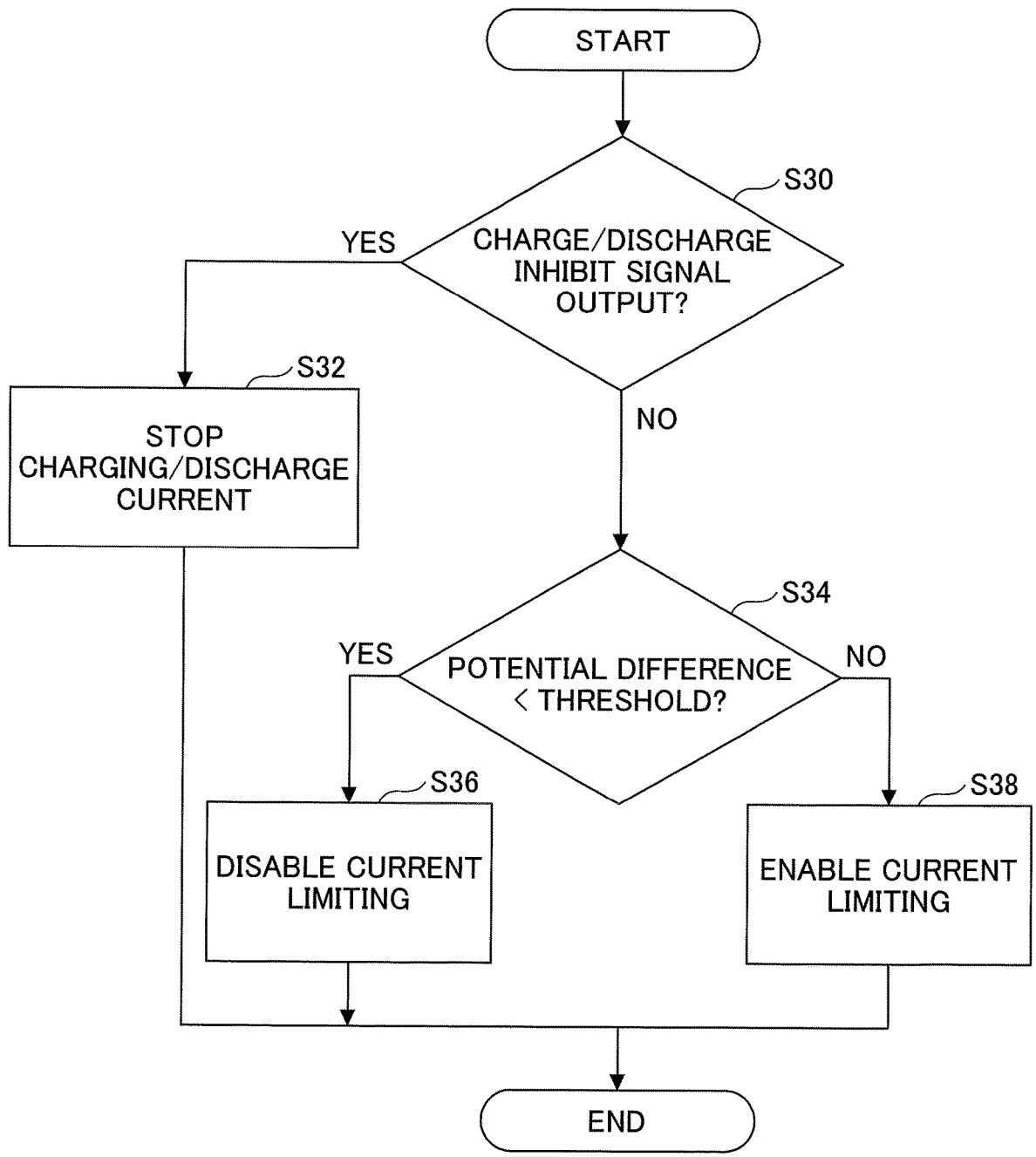
FIG. 7 is a flowchart illustrating charging/discharge control according to the battery protection method.

The charging control circuit 34 turns off the transistor 11 when a charge inhibit signal is output from at least one of the overcharging detection circuit 38 and the charging overcurrent detection circuit 32 (YES at step S30 of FIG. 7). By turning off the transistor 11, it is possible to interrupt the power supply path 16 through which a charging current of the cell 201 flows, so that it is possible to stop a charging current flowing through the cell 201 and to protect the cell 201 from overcharging or a charging overcurrent (step S32 of FIG. 7). Likewise, the charging control circuit 44 turns off the transistor 21 when a charge inhibit signal is output from at least one of the overcharging detection circuit 48 and the charging overcurrent detection circuit 42. By turning off the transistor 21, it is possible to interrupt the power supply path 26 through which a charging current of the cell 202 flows, so that it is possible to stop a charging current flowing through the cell 202 and to protect the cell 202 from overcharging or a charging overcurrent.

The discharge control circuit 37 turns off the transistor 12 when a discharge inhibit signal is output from at least one of the overdischarge detection circuit 39 and the discharge overcurrent detection circuit 35 (YES at step S30 of FIG. 7). By turning off the transistor 12, it is possible to interrupt the power supply path 16 through which the discharge current of the cell 201 flows, so that it is possible to stop the discharge current flowing through the cell 201 and to protect the cell 201 from overdischarge or a discharge overcurrent (step S32 of FIG. 7). Likewise, the discharge control circuit 47 turns off the transistor 22 when a discharge inhibit signal is output from at least one of the overdischarge detection circuit 49 and the discharge overcurrent detection circuit 45. By turning off the transistor 22, it is possible to interrupt the power supply path 26 through which the discharge current of the cell 202 flows, so that it is possible to stop the discharge current flowing through the cell 202 and to protect the cell 202 from overdischarge or a discharge overcurrent.

The charging control circuit 34 determines whether to limit an electric current by the charging current limiting circuit 33 or stop an electric current by the charging overcurrent detection circuit 32 in accordance with a potential difference $\Delta V$ between the electrodes of the same polarity of the cells 201 and 202 (between the negative electrode of the cell 201 and the negative electrode of the cell 202 in the case illustrated in FIG. 1) and/or the charging currents I1 and I2 (step S34 of FIG. 7). For example, letting the charging direction be a positive direction, when the potential difference $\Delta V$ is less than a set threshold Vth that is zero or greater than zero (YES at step S34 of FIG. 7), the charging control circuit 34 disables the charging current limiting circuit 33 from limiting the flow of the charging current I1 and enables the charging overcurrent detection circuit 32 to stop the flow of the charging current I1 (step S36 of FIG. 7). On the other hand, for example, letting the charging direction be a positive direction, when the potential difference $\Delta V$ is greater than or equal to the set threshold Vth (NO at step S34 of FIG. 7), the charging control circuit 34 enables the charging current limiting circuit 33 to limit the flow of the charging current I1 and disables the charging overcurrent detection circuit 32 from stopping the flow of the charging current I1 (step S38 of FIG. 7).

The charging control circuit 34 is capable of determining whether an excessive charging/discharge current flows between the cells 201 and 202 by determining whether or not the potential difference $\Delta V$ is greater than or equal to the set threshold Vth. Letting the charging direction be a positive direction, when the potential difference $\Delta V$ is greater than or equal to the set threshold Vth, an excessive charging/discharge current flows between the cells 201 and 202. In such a state, even when a charging overcurrent is detected by the charging overcurrent detection circuit 32, it is possible to cause the charging current I1 to continue to flow at a current value greater than zero by limiting the flow of the charging current I1 by the charging current limiting circuit 33. On the other hand, letting the charging direction be a positive direction, when the potential difference $\Delta V$ is less than the set threshold Vth, no excessive charging/discharge current flows between the cells 201 and 202. In such a state, when a charging overcurrent is detected by the charging overcurrent detection circuit 32, it is possible to stop the flow of the charging current I1.

The charging control circuit 44 also determines whether to limit an electric current by the charging current limiting circuit 43 or stop an electric current by the charging overcurrent detection circuit 42 in accordance with the potential difference $\Delta V$ and/or the charging currents I1 and I2. The charging control circuit 44 may be the same circuit as the charging control circuit 34 as described above, and accordingly, its detailed description is omitted. The same effects as those of the charging control circuit 34 as described above are obtained with respect to the charging current I2.

The discharge control circuit 37 determines whether to limit an electric current by the discharge current limiting circuit 36 or stop an electric current by the discharge overcurrent detection circuit 35 in accordance with the potential difference $\Delta V$ and/or the discharge currents I1' and I2' (step S34 of FIG. 7). For example, letting the discharge direction be a positive direction, when the potential difference $\Delta V$ is less than the set threshold Vth that is zero or greater than zero (YES at step S34 of FIG. 7), the discharge control circuit 37 disables the discharge current limiting circuit 36 from limiting the flow of the discharge current I1' and enables the discharge overcurrent detection circuit 35 to stop the flow of the discharge current I1' (step S36 of FIG. 7). On the other hand, for example, letting the discharge direction be a positive direction, when the potential difference $\Delta V$ is greater than or equal to the set threshold Vth (NO at step S34 of FIG. 7), the discharge control circuit 37 enables the discharge current limiting circuit 36 to limit the flow of the discharge current I1' and disables the discharge overcurrent detection circuit 35 from stopping the flow of the discharge current I1' (step S38 of FIG. 7).

The discharge control circuit 37 is capable of determining whether an excessive charging/discharge current flows between the cells 201 and 202 by determining whether or not the potential difference ΔV is greater than or equal to the set threshold Vth. Letting the discharge direction be a positive direction, when the potential difference ΔV is greater than or equal to the set threshold Vth, an excessive charging/discharge current flows between the cells 201 and 202. In such a state, even when a discharge overcurrent is detected by the discharge overcurrent detection circuit 35, it is possible to cause the discharge current I1' to continue to flow at a current value greater than zero by limiting the flow of the discharge current I1' by the discharge current limiting circuit 36. On the other hand, letting the discharge direction be a positive direction, when the potential difference ΔV is less than the set threshold Vth, no excessive charging/discharge current flows between the cells 201 and 202. In such a state, when a discharge overcurrent is detected by the discharge overcurrent detection circuit 35, it is possible to stop the flow of the discharge current I1'.

The discharge control circuit 47 also determines whether to limit an electric current by the discharge current limiting circuit 46 or stop an electric current by the discharge overcurrent detection circuit 45 in accordance with the potential difference ΔV and/or the discharge currents I1' and I2'. The discharge control circuit 47 may be the same circuit as the discharge control circuit 37 as described above, and accordingly, its detailed description is omitted. The same effects as those of the discharge control circuit 37 as described above are obtained with respect to the discharge current I2'.

The potential difference ΔV may be obtained by detecting the voltage between the VSS1 terminal and the VSS2 terminal (or the voltage between the cell connection terminal 17 and the cell connection terminal 27). The charging current I1 and the discharge current I1' may be obtained by detecting the voltage across the resistor 13, and the charging current I2 and the discharge current I2' may be obtained by detecting the voltage across the resistor 23.

The charging overcurrent detection circuit 32 and the charging current limiting circuit 33 are connected in parallel to each other. A detected current value supplied from the current detection circuit 31 is input to each of the charging overcurrent detection circuit 32 and the charging current limiting circuit 33.

The charging overcurrent detection circuit 32 includes, for example, a comparator 32a for determining whether or not a detected value of the charging current I1 supplied from the current detection circuit 31 is greater than or equal to the predetermined first charging overcurrent detection threshold. When the comparator 32a determines that a detected value of the charging current I1 is greater than or equal to the predetermined first charging overcurrent detection threshold, the charging overcurrent detection circuit 32 outputs a charging inhibit signal to prevent the charging current I1 from flowing through the cell 201 to the charging control circuit 34.

The charging current limiting circuit 33 includes, for example, a comparator 33a for determining whether a detected value of the charging current I1 supplied from the current detection circuit 31 is greater or smaller than the charging current value Icth1. The charging current limiting circuit 33 outputs an analog adjustment signal for adjusting a control voltage value to be input to the transistor 11 in accordance with the magnitude relationship between the detected value of the charging current I1 and the charging current value Icth1 determined by the comparator 33a.

Likewise, the charging overcurrent detection circuit 42 and the charging current limiting circuit 43 are connected in parallel to each other. A detected current value supplied from the current detection circuit 41 is input to each of the charging overcurrent detection circuit 42 and the charging current limiting circuit 43. The charging over current detection circuit 42 and the charging current limiting circuit 43 include respective comparators 42a and 43a and output analog adjustment signals in accordance with the determination results of the respective comparators 42a and 43a the same as in the case of the charging overcurrent detection circuit 32 and the charging current limiting circuit 33, and accordingly, a description thereof is omitted. The same is the case with the discharge overcurrent detection circuit 35 and the discharge current limiting circuit 36 and with the discharge overcurrent detection circuit 45 and the discharge current limiting circuit 46, and accordingly, a description thereof is omitted.

Figure 2:
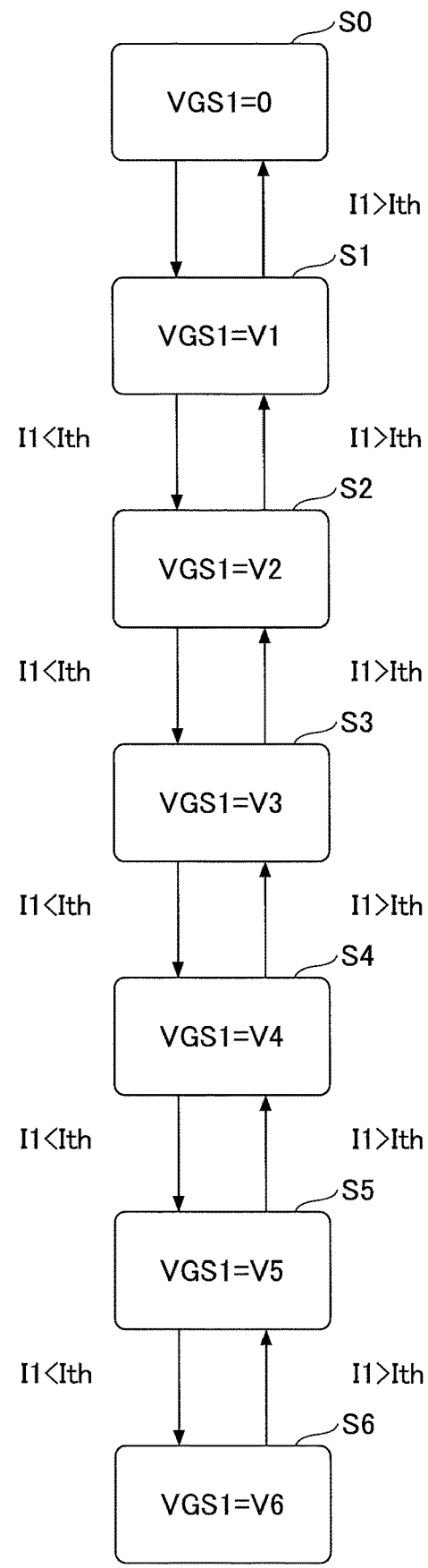
FIG. 2 is a diagram illustrating an example of a battery protection method.

FIG. 2 is a state transition chart illustrating a flow of control processes included in a battery protection method executed in the charging current limiting circuit 33. In FIG. 2, S0 through S6 represent control states of the charging current limiting circuit 33. The battery protection method is executed in the same flow as illustrated in FIG. 2 in the charging current limiting circuit 43, the discharge current limiting circuit 36, and the discharge current limiting circuit 46. Therefore, an operation of the charging current limiting circuit 33 is exemplarily described below, and a description of operations of the charging current limiting circuit 43, the discharge current limiting circuit 36, and the discharge current limiting circuit 46 is omitted or simplified.

In FIG. 2, VGS1 represents the gate-source voltage (gate voltage) of the transistor 11, and V1 through V6 represent voltage values of the gate voltage VGS1. All of V1 through V6 are voltage values greater than or equal to the ON-threshold of the transistor 11. That is, in States S1 through S6, the charging current I1 is flowing with the transistor 11 being on. The voltage values of the gate voltage VGS1 satisfy the relation of 0<V1<V2<V3<V4<V5<V6.

A threshold Ith corresponds to the above-described charging current value Icth1. When the charging current I1 is smaller than the threshold Ith (I1<Ith), the charging current limiting circuit 33 determines that the charging current I1 is at a normal value. On the other hand, when the charging current I1 is greater than the threshold Ith (I1>Ith), the charging current limiting circuit 33 determines that the charging current I1 is an excessive charging current.

First, in the initial state (State S0) of the charging current limiting circuit 33 at the time of turning on power, the charging current limiting circuit 33 sets the gate voltage value of the transistor 11 to zero so that the transistor 11 is off at a start. As a result, it is possible to prevent an excessive charging current I1 from flowing through the cell 201 at the time of turning on power.

The charging current limiting circuit 33 sets the gate voltage value to V1 so as to turn on the transistor 11 to allow the charging current I1 to flow through the cell 201. As a result of the gate voltage value V1 being a value slightly greater than the ON-threshold of the transistor 11, it is possible to turn the transistor 11 half on. As a result, it is possible to cause the charging current I1 to flow through the transistor 11 at a limited current value.

The charging current limiting circuit 33 repeats determining whether a detected value of the charging current I1 is smaller than the charging current value Ith every time the gate voltage of the transistor 11 is gradually increased or decreased.

In response to determining that a detected value of the charging current I1 is smaller than the charging current value Ith, the charging current limiting circuit 33 performs the charging current increasing control to allow the charging current I1 to increase to a value lower than the charging current value Ith by changing the gate voltage of the transistor 11 to a higher value. By increasing the gate voltage of the transistor 11, it is possible to increase the allowable upper limit value of the charging current I1. The allowable upper limit value of the charging current I1 is a current value to which the charging current I1 may be maximized.

On the other hand, in response to determining that a detected value of the charging current I1 is greater than the charging current value Ith, the charging current limiting circuit 33 performs the charging current decreasing control to decrease the current value of the charging current I1 by changing the gate voltage of the transistor 11 to a lower value. By decreasing the gate voltage of the transistor 11, it is possible to decrease the allowable upper limit value of the charging current I1.

By repeating such control, it is possible to cause the charging current I1 to continue to flow at around the charging current value Ith even when the charging current I1 is going to excessively increase.

For example, in State S1, the charging current limiting circuit 33 determines whether a detected value of the charging current I1 is smaller than the predetermined charging current value Ith. When a detected value of the charging current I1 is smaller than the predetermined charging current value Ith, the charging current limiting circuit 33 increases the gate voltage value of the transistor 11 from V1 to V2 (transitions from S1 to S2). Voltage Value V2 is a value slightly greater than Voltage Value V1. As a result, the value of an electric current that is allowed to flow by the transistor 11 slightly increases, so that it is possible to increase the allowable upper limit value of the charging current I1. In State S2, the charging current limiting circuit 33 allows the charging current I1 to flow through the transistor 11 at a limited current value by turning the transistor 11 half on.

In State S2, the charging current limiting circuit 33 determines whether a detected value of the charging current I1 is smaller than the predetermined charging current value Ith.

In State S2, when a detected value of the charging current I1 is smaller than the predetermined charging current value Ith, the charging current limiting circuit 33 increases the gate voltage value of the transistor 11 from V2 to V3 (transitions from S2 to S3). Voltage Value V3 is a value slightly greater than Voltage Value V2. As a result, the value of an electric current that is allowed to flow by the transistor 11 slightly increases, so that it is possible to further increase the allowable upper limit value of the charging current I1. In State S3, the charging current limiting circuit 33 allows the charging current I1 to flow through the transistor 11 at a limited current value by turning the transistor 11 half on.

In response to determining in State S5 that a detected value of the charging current I1 is smaller than the charging current value Ith even after gradually increasing the allowable upper limit value of the charging current I1 by the transistor 11 in each state, the charging current limiting circuit 33 increases the size of increase of the allowable upper limit value of the charging current I1 by the transistor 11. For example, the charging current limiting circuit 33 increases the size of increase of the allowable upper limit value of the charging current I1 by causing the gate voltage of the transistor 11 to be higher than the ON-threshold of the transistor 11 by a predetermined value or more. For example, the charging current limiting circuit 33 causes the size of increase of the gate voltage of the transistor 11 from S5 to S6 to be greater than a previous size of increase of the gate voltage of the transistor 11 (for example, the size of increase from S4 to S5). As a result, the transistor 11 is turned fully on. Therefore, the ON-resistance of the transistor 11 is reduced, so that it is possible to suppress an increase in the generated heat of the transistor 11.

On the other hand, in response to determining in State S1 that a detected value of the charging current I1 is greater than the charging current value Ith even after gradually decreasing the allowable upper limit value of the charging current I1 by the transistor 11 in each state, the charging current limiting circuit 33 increases the size of decrease of the allowable upper limit value of the charging current I1 by the transistor 11. For example, the charging current limiting circuit 33 increases the size of decrease of the allowable upper limit value of the charging current I1 by causing the gate voltage of the transistor 11 to be lower than the ON-threshold of the transistor 11 by a predetermined value or more. For example, the charging current limiting circuit 33 causes the size of decrease of the gate voltage of the transistor 11 from S1 to S0 to be greater than a previous size of decrease of the gate voltage of the transistor 11 (for example, the size of decrease from S3 to S2). As a result, the transistor 11 is turned off. Therefore, it is possible to prevent an excessive charging current I1 from continuing to flow through the cell 201.

The four limiting circuits of the charging current limiting circuits 33 and 43 and the discharge current limiting circuits 36 and 46 perform the same control as described above independently of one another. For example, the discharge current limiting circuit 46 also repeats determining whether a detected value of the discharge current I2' is smaller than a discharge current value Ith' every time the gate voltage of the transistor 22 is gradually increased or decreased.

In response to determining that a detected value of the discharge current I2' is smaller than the discharge current value Ith', the discharge current limiting circuit 46 performs the discharge current increasing control to allow the discharge current I2' to increase to a value lower than the discharge current value Ith' by changing the gate voltage of the transistor 22 to a higher value. By increasing the gate voltage of the transistor 22, it is possible to increase the allowable upper limit value of the discharge current I2'. The allowable upper limit value of the discharge current I2' is a current value to which the discharge current I2' may be maximized.

On the other hand, in response to determining that a detected value of the discharge current I2' is greater than the discharge current value Ith', the discharge current limiting circuit 46 performs the discharge current decreasing control to decrease the current value of the discharge current I2' by changing the gate voltage of the transistor 22 to a lower value. By decreasing the gate voltage of the transistor 22, it is possible to decrease the allowable upper limit value of the discharge current I2'.

By repeating such control, it is possible to cause the discharge current I2' to continue to flow at around the discharge current value Ith' even when the discharge current I2' is going to excessively increase.

For example, in State S1, the discharge current limiting circuit 46 determines whether a detected value of the discharge current I2' is smaller than the predetermined discharge current value Ith'. When a detected value of the discharge current I2' is smaller than the predetermined discharge current value Ith', the discharge current limiting circuit 46 increases the gate voltage value of the transistor 22 from V1 to V2 (transitions from S1 to S2). Voltage Value V2 is a value slightly greater than Voltage Value V1. As a result, the value of an electric current that is allowed to flow by the transistor 22 slightly increases, so that it is possible to increase the allowable upper limit value of the discharge current I2'. In State S2, the discharge current limiting circuit 46 allows the discharge current I2' to flow through the transistor 22 at a limited current value by turning the transistor 22 half on.

Furthermore, the same as described above, in response to determining in State S5 that a detected value of the discharge current I2' is smaller than the discharge current value Ith' even after gradually increasing the allowable upper limit value of the discharge current I2' by the transistor 22 in each state, the discharge current limiting circuit 46 increases the size of increase of the allowable upper limit value of the discharge current I2' by the transistor 22. For example, the discharge current limiting circuit 46 increases the size of increase of the allowable upper limit value of the discharge current I2' by causing the gate voltage of the transistor 22 to be higher than the ON-threshold of the transistor 22 by a predetermined value or more. For example, the discharge current limiting circuit 46 causes the size of increase of the gate voltage of the transistor 22 from S5 to S6 to be greater than a previous size of increase of the gate voltage of the transistor 22 (for example, the size of increase from S4 to S5). As a result, the transistor 22 is turned fully on. Therefore, the ON-resistance of the transistor 22 is reduced, so that it is possible to suppress an increase in the generated heat of the transistor 22.

On the other hand, in response to determining in State S1 that a detected value of the discharge current I2' is greater than the discharge current value Ith' even after gradually decreasing the allowable upper limit value of the discharge current I2' by the transistor 22 in each state, the discharge current limiting circuit 46 increases the size of decrease of the allowable upper limit value of the discharge current I2' by the transistor 22. For example, the discharge current limiting circuit 46 increases the size of decrease of the allowable upper limit value of the discharge current I2' by causing the gate voltage of the transistor 22 to be lower than the ON-threshold of the transistor 22 by a predetermined value or more. For example, the discharge current limiting circuit 46 causes the size of decrease of the gate voltage of the transistor 22 from S1 to S0 to be greater than a previous size of decrease of the gate voltage of the transistor 22 (for example, the size of decrease from S3 to S2). As a result, the transistor 22 is turned off. Therefore, it is possible to prevent an excessive discharge current I2' from continuing to flow through the cell 202.

The charging current limiting circuit 43 and the discharge current limiting circuit 36 operate in the same manner as described above.

Figure 3:
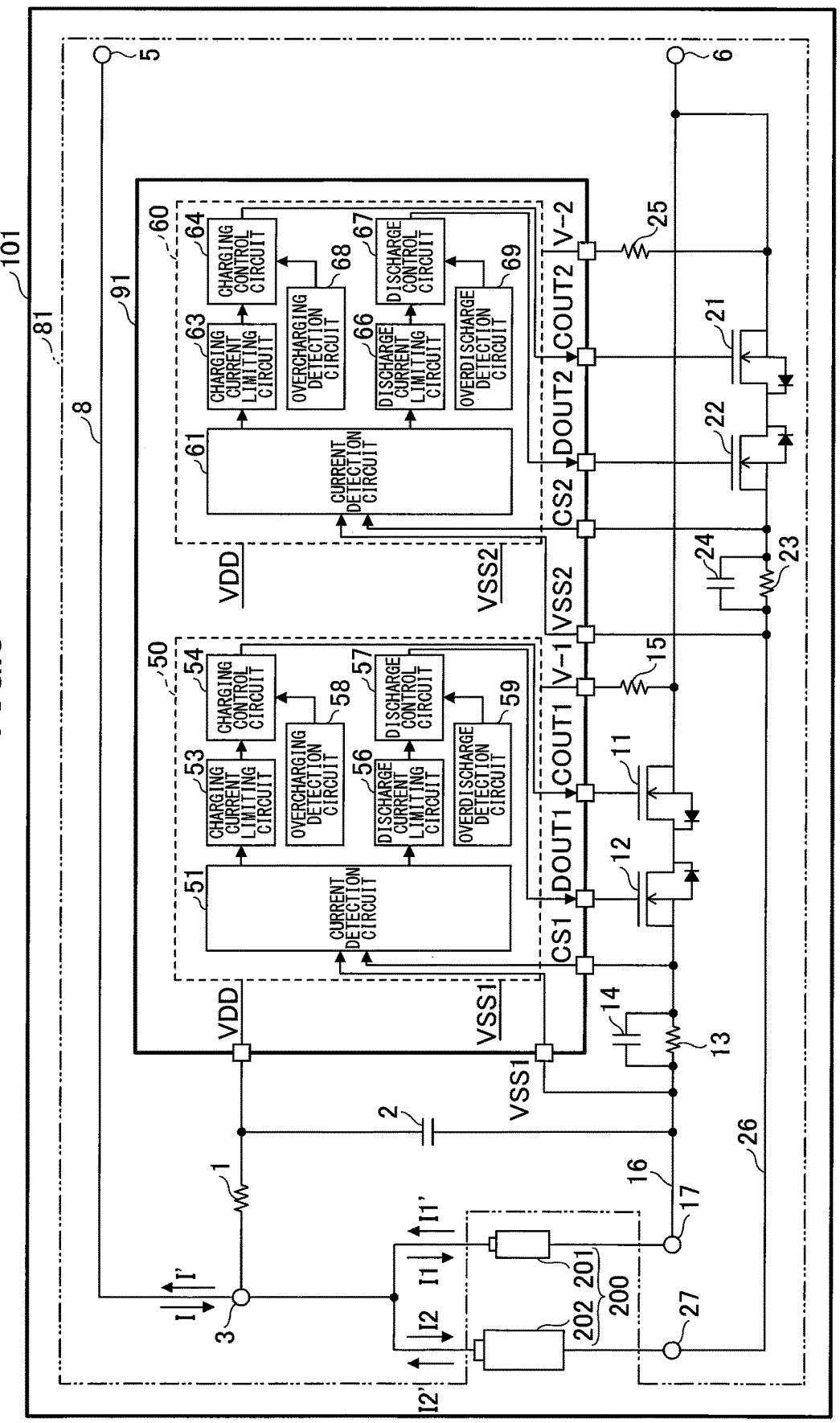
FIG. 3 is a diagram illustrating a configuration of a battery protection circuit.

FIG. 3 is a diagram illustrating a first configuration of a battery pack 101 that is an embodiment of the present invention. A description of the same configurations and effects as those of the above-described embodiment is omitted or simplified. The battery pack 101 includes a protection module 81.

The protection module 81 is an example of a battery protection device that protects a rechargeable battery including multiple cells connected in parallel. The protection module 81 includes a protection IC 91 that includes protection control parts. The protection control parts are provided one for each of the cells forming the rechargeable battery, and control protection of the corresponding cells. A protection control circuit 50 is an example of a protection control circuit that is provided for the cell 201 and controls protection of the cell 201. A protection control circuit 60 is an example of a protection control circuit that is provided for the cell 202 and controls protection of the cell 202.

The protection control circuit 50 includes a current detection circuit 51, a charging current limiting circuit 53, a charging control circuit 54, a discharge current limiting circuit 56, a discharge control circuit 57, an overcharging detection circuit 58, and an overdischarge detection circuit 59. The protection control circuit 60 includes a current detection circuit 61, a charging current limiting circuit 63, a charging control circuit 64, a discharge current limiting circuit 66, a discharge control circuit 67, an overcharging detection circuit 68, and an overdischarge detection circuit 69.

The current detection circuit 51, the charging control circuit 54, the discharge control circuit 57, the overcharging detection circuit 58, and the overdischarge detection circuit 59 are the same circuits as the current detection circuit 31, the charging control circuit 34, the discharge control circuit 37, the overcharging detection circuit 38, and the overdischarge detection circuit 39, respectively, in FIG. 1. The current detection circuit 61, the charging control circuit 64, the discharge control circuit 67, the overcharging detection circuit 68, and the overdischarge detection circuit 69 are the same circuits as the current detection circuit 41, the charging control circuit 44, the discharge control circuit 47, the overcharging detection circuit 48, and the overdischarge detection circuit 49, respectively, in FIG. 1.

The charging current limiting circuit 53 is a circuit that includes the current limiting function of the charging current limiting circuit 33 and the current stopping function of the charging overcurrent detection circuit 32 in FIG. 1. The charging current limiting circuit 63 is a circuit that includes the current limiting function of the charging current limiting circuit 43 and the current stopping function of the charging overcurrent detection circuit 42 in FIG. 1. The discharge current limiting circuit 56 is a circuit that includes the current limiting function of the discharge current limiting circuit 36 and the current stopping function of the discharge overcurrent detection circuit 35 in FIG. 1. The discharge current limiting circuit 66 is a circuit that includes the current limiting function of the discharge current limiting circuit 46 and the current stopping function of the discharge overcurrent detection circuit 45 in FIG. 1.

The current limiting function and the current stopping function of the charging current limiting circuit 53 share a detected value of the charging current I1 or the discharge current I1' obtained by the current detection circuit 51. As a result, a comparator to which a detected value of the charging current I1 or the discharge current I1' is input may be shared by both functions. The charging current limiting circuit 53 enables one of the current limiting function and the current stopping function to operate and disables the other from operating in accordance with the potential difference ΔV between the electrodes of the same polarity of the cells 201 and 202 and/or the charging currents I1 and I2.

The charging current limiting circuit 63, the discharge current limiting circuit 56, and the discharge current limiting circuit 66 have the same functions as the charging current limiting circuit 53, and therefore, achieve the same effects as the charging current limiting circuit 53.

Figure 4:
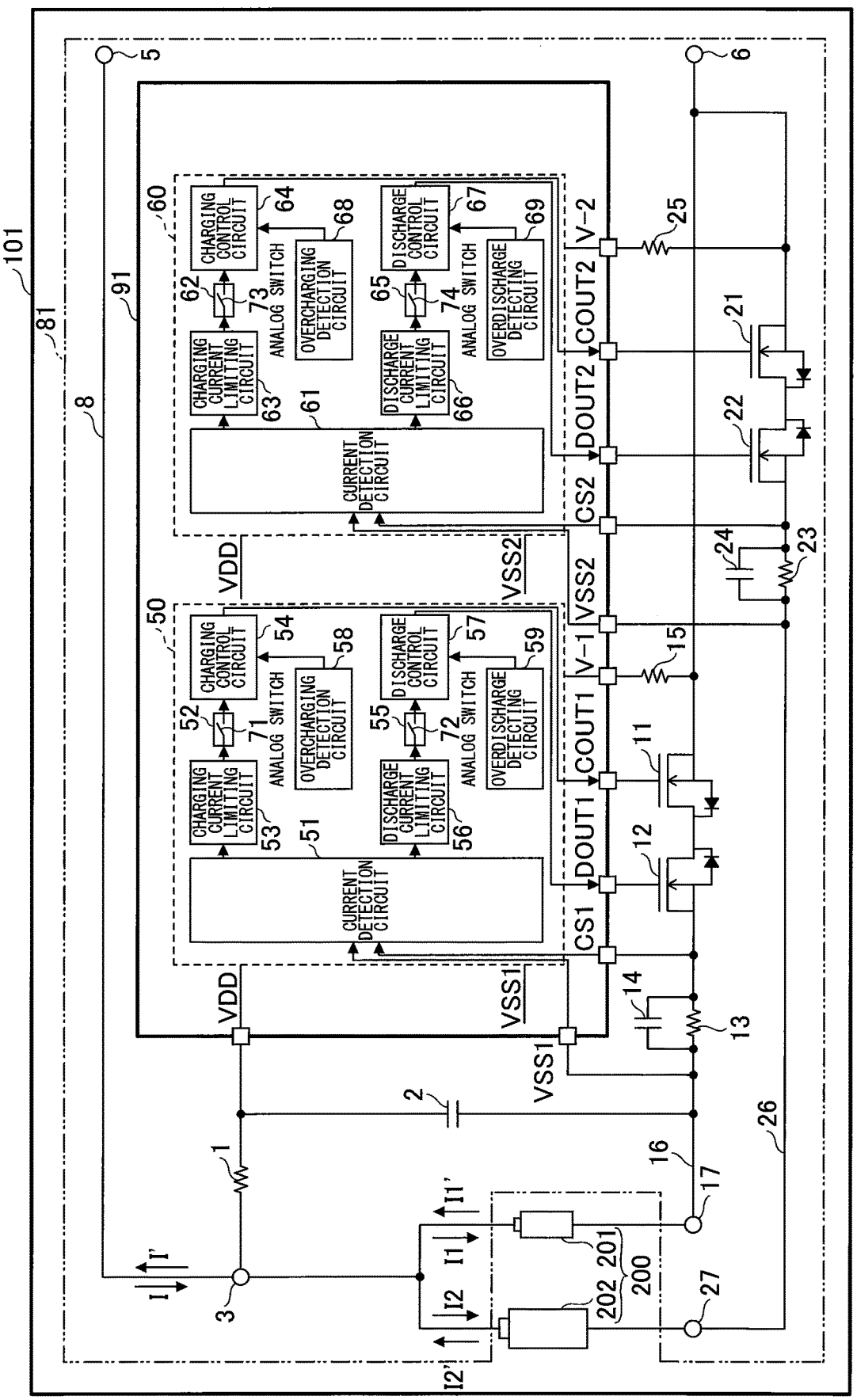
FIG. 4 is a diagram illustrating a configuration of a battery protection circuit.

FIG. 4 is a diagram illustrating a second configuration of the battery pack 101 that is an embodiment of the present invention. A description of the same configurations and effects as those of the above-described embodiments is omitted or simplified.

Referring to FIG. 4, a charging overcurrent detection circuit 52 is a circuit that includes the current stopping function of the charging overcurrent detection circuit 32 in FIG. 1, and a charging overcurrent detection circuit 62 is a circuit that includes the current stopping function of the charging overcurrent detection circuit 42 in FIG. 1. Furthermore, the charging current limiting circuit 53 is a circuit that includes the current limiting function of the charging current limiting circuit 33 in FIG. 1, and the charging current limiting circuit 63 is a circuit that includes the current limiting function of the charging current limiting circuit 43 in FIG. 1. Likewise, a discharge overcurrent detection circuit 55 is a circuit that includes the current stopping function of the discharge overcurrent detection circuit 35 in FIG. 1, and a discharge overcurrent detection circuit 65 is a circuit that includes the current stopping function of the discharge overcurrent detection circuit 45 in FIG. 1. Furthermore, the discharge current limiting circuit 56 is a circuit that includes the current limiting function of the discharge current limiting circuit 36 in FIG. 1, and the discharge current limiting circuit 66 is a circuit that includes the current limiting function of the discharge current limiting circuit 46 in FIG. 1.

The charging current limiting circuit 53 and the charging overcurrent detection circuit 52 are connected in series. In the case of FIG. 4, a detected current value supplied from the current detection circuit 51 is input to the charging overcurrent detection circuit 52 via the charging current limiting circuit 53, and the output of the charging current limiting circuit 53 is input to the charging overcurrent detection circuit 52.

The charging current limiting circuit 53 outputs an analog adjustment signal for adjusting a control voltage value input to the transistor 11 to the charging control circuit 54 via an analog switch 71. The ON/OFF control of the analog switch 71 is performed in accordance with a signal output from the charging overcurrent detection circuit 52.

When no charging overcurrent is detected, the charging overcurrent detection circuit 52 enables the charging current limiting circuit 53 to output an analog adjustment signal to the charging control circuit 54 by turning on the analog switch 71. When limiting an electric current by the charging current limiting circuit 53 is allowed, the charging control circuit 54 controls the ON-state of the transistor 11 in accordance with the analog adjustment signal.

On the other hand, when a charging overcurrent is detected, the charging overcurrent detection part 52 disables the charging current limiting circuit 53 from outputting an analog adjustment signal to the charging control circuit 54 by turning off the analog switch 71. When a charging overcurrent is detected, the charging overcurrent detection part 52 outputs a charge inhibit signal to prevent the charging current I1 from flowing through the cell 201 to the charging control circuit 54. When a charge inhibit signal is output, the charging control circuit 54 turns off the transistor 11.

The series configuration of the charging current limiting circuit 63 and the charging overcurrent detection circuit 62, an analog switch 73, and the charging control circuit 64 have the same functions as the series configuration of the charging current limiting circuit 53 and the charging overcurrent detection circuit 52, the analog switch 71, and the charging control circuit 54, respectively. The series configuration of the discharge current limiting circuit 56 and the discharge overcurrent detection circuit 55, an analog switch 72, and the discharge control circuit 57 have the same functions as the series configuration of the charging current limiting circuit 53 and the charging overcurrent detection circuit 52, the analog switch 71, and the charging control circuit 54, respectively. The series configuration of the discharge current limiting circuit 66 and the discharge overcurrent detection circuit 65, an analog switch 74, and the discharge control circuit 67 have the same functions as the series configuration of the charging current limiting circuit 53 and the charging overcurrent detection circuit 52, the analog switch 71, and the charging control circuit 54, respectively. Accordingly, their description is omitted.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. A description is given above of a battery protection circuit, a battery protection device, a battery pack, and a battery protection method based on embodiments. It should be understood, however, that the various changes, substitutions, and alterations could be made hereto without departing from the spirit and scope of the invention.

For example, while the case where the number of cells connected in parallel of the rechargeable battery 200 is two is illustrated by way of example, embodiments of the present invention may also be applied to the case where the number of cells connected in parallel of the rechargeable battery 200 is three or more. Furthermore, the transistor 11 and the transistor 12 may switch their placement positions illustrated in the drawings. Furthermore, the transistor 21 and the transistor 22 may switch their placement positions illustrated in the drawings.

Furthermore, the case where the charging control transistors 11 and 21, the discharge control transistors 12 and 22, and the resistors 13 and 23 are inserted in the negative-side power supply path 16 or 26 is illustrated by way of example. Alternatively, the charging control transistors 11 and 21, the discharge control transistors 12 and 22, and the resistors 13 and 23 may be inserted in the positive-side power supply path 8.

Furthermore, each cell forming a rechargeable battery may be a single cell or a group of cells connected in series or parallel. Furthermore, the cells of a rechargeable battery may have the same capacity value or different capacity values.

Furthermore, devices that limit a charging current and devices that limit a discharge current are not limited to n-channel MOSFETs, and may be other forms of devices such as p-channel MOSFETs, bipolar transistors, photocouplers, and sensors.

The protection IC 90 (91) or the protection module 80 (81) does not have to be housed in a battery pack, and may be attached to an electrical load such as an electronic device supplied with electric power from a rechargeable battery.

What is claimed is:

1. A battery protection device that protects a rechargeable battery including a plurality of cells connected in parallel, the battery protection device comprising:
   an overcharging detection part provided for each of the cells and configured to prevent the corresponding cell from being charged in response to detecting overcharging of the corresponding cell;
   an overdischarge detection part provided for each of the cells and configured to prevent the corresponding cell from being discharged in response to detecting overdischarge of the corresponding cell;
   a charging control device provided in a charging path of each of the cells and configured to interrupt the charging path of the corresponding cell when the overcharging detection part prevents the corresponding cell from being charged;
   a discharge control device provided in a discharge path of each of the cells and configured to interrupt the discharge path of the corresponding cell when the overdischarge detection part prevents the corresponding cell from being discharged;
   a charging current limiting part provided for each of the cells and configured to, by using the charging control device, limit a charging current flowing through the corresponding cell to prevent the charging current from exceeding a predetermined charging current value and prevent an excessive charging current or discharge current from flowing between the cells, while causing the charging current to continue to flow at a first value greater than zero during a period for which the charging current flows through the corresponding cell;
   a charging overcurrent detection part provided for each of the cells and configured to prevent the corresponding cell from being charged in response to detecting a charging overcurrent of the corresponding cell;
   a discharge current limiting part provided for each of the cells and configured to, by using the discharge control device, to limit a flow of a discharge current to prevent the discharge current from exceeding a predetermined discharge current value while causing the discharge current to continue to flow at a second value greater than zero during a period for which the discharge current flows through the corresponding cell;
   a discharge overcurrent detection part provided for each of the cells and configured to prevent the corresponding cell from being discharged in response to detecting a discharge overcurrent of the corresponding cell;
   a charging control part configured to determine whether to limit an electric current by the charging current limiting part or stop the electric current by the charging overcurrent detection part in accordance with a potential difference between electrodes of a same polarity of the cells; and
   a discharge control part configured to determine whether to limit the electric current by the discharge current limiting part or stop the electric current by the discharge overcurrent detection part in accordance with the potential difference between the electrodes of the same polarity of the cells,
   wherein the charging control part is configured to, in charging the corresponding cell,
   output a first signal that allows charging of the corresponding cell to be stopped to the charging control device, when a voltage of the corresponding cell is higher than or equal to an overcharging detection threshold or the charging current is greater than or equal to a charging overcurrent detection threshold,
   output a second signal that allows the charging of the corresponding cell without limiting the charging current to the charging control device, when the voltage of the corresponding cell is lower than the overcharging detection threshold, the charging current is smaller than the charging overcurrent detection threshold, and the potential difference between the electrodes of the same polarity of the cells is less than a predetermined threshold, and
   output a third signal that limits the charging current to the first value greater than zero to the charging control device instead of the second signal, when the voltage of the corresponding cell is lower than the overcharging detection threshold, the charging current is smaller than the charging overcurrent detection threshold, and the potential difference between the electrodes of the same polarity of the cells is greater than or equal to the predetermined threshold, and
   wherein a voltage of the second signal is higher than a voltage of the third signal and the voltage of the third signal is higher than a voltage of the first signal.

2. A battery pack, comprising:
   the battery protection device as set forth in claim 1; and
   the rechargeable battery.

3. The battery protection device as claimed in claim 1,
   wherein the charging current limiting part is configured to allow the charging current to increase to a value lower than the predetermined charging current value by using the charging control device when a detected value of the charging current is smaller than the predetermined charging current value, and to decrease a current value of the charging current by using the charging control device when the detected value of the charging current is greater than the predetermined charging current value, and
   wherein the discharge current limiting part is configured to allow the discharge current to increase to a value lower than the predetermined discharge current value by using the discharge control device when a detected value of the discharge current is smaller than the predetermined discharge current value, and to decrease a current value of the discharge current by using the discharge control device when the detected value of the discharge current is greater than the predetermined discharge current value.

4. The battery protection device as claimed in claim 3,
   wherein the charging current limiting part is configured to increase an allowable upper limit value of the charging current by using the charging control device when the detected value of the charging current is smaller than the predetermined charging current value, and
   wherein the discharge current limiting part is configured to increase an allowable upper limit value of the discharge current by using the discharge control device when the detected value of the discharge current is smaller than the predetermined discharge current value.

5. The battery protection device as claimed in claim 4,
   wherein the charging control device is a charging control transistor that controls the charging current,
   wherein the discharge control device is a discharge control transistor that controls the discharge current,
   wherein the charging current limiting part is configured to change the allowable upper limit value of the charging current by controlling a control voltage of the charging control transistor, and wherein the discharge current limiting part is configured to change the allowable upper limit value of the discharge current by controlling a control voltage of the discharge control transistor.

6. The battery protection device as claimed in claim 4, wherein the charging current limiting part is configured to increase a size of increase of the allowable upper limit value of the charging current by using the charging control device when the detected value of the charging current is smaller than the predetermined charging current value after gradually increasing the allowable upper limit value of the charging current by using the charging control device, and
wherein the discharge current limiting part is configured to increase a size of increase of the allowable upper limit value of the discharge current by using the discharge control device when the detected value of the discharge current is smaller than the predetermined discharge current value after gradually increasing the allowable upper limit value of the discharge current by using the discharge control device.

7. The battery protection device as claimed in claim 6, wherein the charging control device is a charging control transistor that controls the charging current,
wherein the discharge control device is a discharge control transistor that controls the discharge current,
wherein the charging current limiting part is configured to increase the size of increase of the allowable upper limit value of the charging current by causing a control voltage of the charging control transistor to be higher than an ON-threshold of the charging control transistor by a first predetermined value or more, and
wherein the discharge current limiting part is configured to increase the size of increase of the allowable upper limit value of the discharge current by causing a control voltage of the discharge control transistor to be higher than an ON-threshold of the discharge control transistor by a second predetermined value or more.

8. The battery protection device as claimed in claim 4, wherein the charging current limiting part is configured to decrease the allowable upper limit value of the charging current by using the charging control device when the detected value of the charging current is greater than the predetermined charging current value, and
wherein the discharge current limiting part is configured to decrease the allowable upper limit value of the discharge current when the detected value of the discharge current is greater than the predetermined discharge current value by using the discharge control device.

9. The battery protection device as claimed in claim 8, wherein the charging current limiting part is configured to increase a size of decrease of the allowable upper limit value of the charging current by using the charging control device when the detected value of the charging current is greater than the predetermined charging current value after gradually decreasing the allowable upper limit value of the charging current by using the charging control device, and
wherein the discharge current limiting part is configured to increase a size of decrease of the allowable upper limit value of the discharge current by using the discharge control device when the detected value of the discharge current is greater than the predetermined discharge current value after gradually decreasing the allowable upper limit value of the discharge current by using the discharge control device.

10. The battery protection device as claimed in claim 9, wherein the charging control device is a charging control transistor that controls the charging current,
wherein the discharge control device is a discharge control transistor that controls the discharge current,
wherein the charging current limiting part is configured to increase the size of decrease of the allowable upper limit value of the charging current by causing a control voltage of the charging control transistor to be lower than an ON-threshold of the charging control transistor by a first predetermined value or more, and
wherein the discharge current limiting part is configured to increase the size of decrease of the allowable upper limit value of the discharge current by causing a control voltage of the discharge control transistor to be lower than an ON-threshold of the discharge control transistor by a second predetermined value or more.

11. A battery protection method for protecting a rechargeable battery including a plurality of cells connected in parallel, the battery protection method comprising:
with respect to each of the cells, performing such control as to limit a charging current flowing through the corresponding cell to prevent the charging current from exceeding a predetermined charging current value and prevent an excessive charging current or discharge current from flowing between the cells, while causing the charging current to continue to flow at a first value greater than zero during a period for which the charging current flows through the cell;
with respect to each of the cells, preventing the corresponding cell from being charged in response to detecting a charging overcurrent of the corresponding cell;
with respect to each of the cells, performing such control as to limit a flow of a discharge current to prevent the discharge current from exceeding a predetermined discharge current value while causing the discharge current to continue to flow at a second value greater than zero during a period for which the discharge current flows through the cell;
with respect to each of the cells, preventing the corresponding cell from being discharged in response to detecting a discharge overcurrent of the corresponding cell;
determining whether to limit an electric current by said performing such control as to limit the charging current or stop the electric current by said preventing the corresponding cell from being charged, in accordance with a potential difference between electrodes of a same polarity of the cells; and
determining whether to limit the electric current by said performing such control as to limit the flow of the discharge current or stop the electric current by said preventing the corresponding cell from being discharged, in accordance with the potential difference between the electrodes of the same polarity of the cells,
wherein, in charging the corresponding cell,
a first signal that allows charging of the corresponding cell to be stopped is output when a voltage of the corresponding cell is higher than or equal to an overcharging detection threshold or the charging current is greater than or equal to a charging overcurrent detection threshold,
a second signal that allows the charging of the corresponding cell without limiting the charging current is output when the voltage of the corresponding cell is lower than the overcharging detection threshold, the charging current is smaller than the charging overcurrent detection threshold, and the potential difference between the electrodes of the same polarity of the cells is less than a predetermined threshold, and a third signal that limits the charging current to the first value greater than zero is output instead of the second signal when the voltage of the corresponding cell is lower than the overcharging detection threshold, the charging current is smaller than the charging overcurrent detection threshold, and the potential difference between the electrodes of the same polarity of the cells is greater than or equal to the predetermined threshold, and wherein a voltage of the second signal is higher than a voltage of the third signal and the voltage of the third signal is higher than a voltage of the first signal.

12. A battery protection circuit that protects a rechargeable battery including a plurality of cells connected in parallel, the battery protection circuit comprising:

a charging current limiting part provided for each of the cells and configured to limit a charging current flowing through the corresponding cell to prevent the charging current from exceeding a predetermined charging current value and prevent an excessive charging current or discharge current from flowing between the cells, while causing the charging current to continue to flow at a first value greater than zero during a period for which the charging current flows through the corresponding cell;

a charging overcurrent detection part provided for each of the cells and configured to prevent the corresponding cell from being charged in response to detecting a charging overcurrent of the corresponding cell;

a discharge current limiting part provided for each of the cells and configured to limit a flow of a discharge current to prevent the discharge current from exceeding a predetermined discharge current value while causing the discharge current to continue to flow at a second value greater than zero during a period for which the discharge current flows through the corresponding cell;

a discharge overcurrent detection part provided for each of the cells and configured to prevent the corresponding cell from being discharged in response to detecting a discharge overcurrent of the corresponding cell;

a charging control part configured to determine whether to limit an electric current by the charging current limiting part or stop the electric current by the charging overcurrent detection part in accordance with a potential difference between electrodes of a same polarity of the cells; and a discharge control part configured to determine whether to limit the electric current by the discharge current limiting part or stop the electric current by the discharge overcurrent detection part in accordance with the potential difference between the electrodes of the same polarity of the cells, wherein the charging control part is configured to, in charging the corresponding cell, output a first signal that allows charging of the corresponding cell to be stopped, when a voltage of the corresponding cell is higher than or equal to an overcharging detection threshold or the charging current is greater than or equal to a charging overcurrent detection threshold, output a second signal that allows the charging of the corresponding cell without limiting the charging current, when the voltage of the corresponding cell is lower than the overcharging detection threshold, the charging current is smaller than the charging overcurrent detection threshold, and the potential difference between the electrodes of the same polarity of the cells is less than a predetermined threshold, and output a third signal that limits the charging current to the first value greater than zero instead of the second signal, when the voltage of the corresponding cell is lower than the overcharging detection threshold, the charging current is smaller than the charging overcurrent detection threshold, and the potential difference between the electrodes of the same polarity of the cells is greater than or equal to the predetermined threshold, and wherein a voltage of the second signal is higher than a voltage of the third signal and the voltage of the third signal is higher than a voltage of the first signal.

13. The battery protection circuit as claimed in claim 12, wherein the charging current limiting part and the charging overcurrent detection part are connected in parallel, and wherein the discharge current limiting part and the discharge overcurrent detection part are connected in parallel.

14. The battery protection circuit as claimed in claim 12, wherein the charging current limiting part and the charging overcurrent detection part are connected in series, and wherein the discharge current limiting part and the discharge overcurrent detection part are connected in series.

15. The battery protection circuit as claimed in claim 12, wherein the charging control part is configured to compare the potential difference with a first threshold, and to determine whether to limit the electric current by the charging current limiting part or stop the electric current by the charging overcurrent detection part based on a result of comparing the potential difference with the first threshold, and the discharge control part is configured to compare the potential difference with a second threshold, and to determine whether to limit the electric current by the discharge current limiting part or stop the electric current by the discharge overcurrent detection part based on a result of comparing the potential difference with the second threshold.

16. The battery protection circuit as claimed in claim 12, wherein the charging current limiting part is configured to allow the charging current to increase to a value lower than the predetermined charging current value when a detected value of the charging current is smaller than the predetermined charging current value, and to decrease a current value of the charging current when the detected value of the charging current is greater than the predetermined charging current value, and wherein the discharge current limiting part is configured to allow the discharge current to increase to a value lower than the predetermined discharge current value when a detected value of the discharge current is smaller than the predetermined discharge current value, and to decrease a current value of the discharge current when the detected value of the discharge current is greater than the predetermined discharge current value.

17. The battery protection circuit as claimed in claim 16, wherein the charging current limiting part is configured to increase an allowable upper limit value of the charging current when the detected value of the charging current is smaller than the predetermined charging current value, and wherein the discharge current limiting part is configured to increase an allowable upper limit value of the discharge current when the detected value of the discharge current is smaller than the predetermined discharge current value.

18. The battery protection circuit as claimed in claim 17, wherein the charging current limiting part is configured to increase a size of increase of the allowable upper limit value of the charging current when the detected value of the charging current is smaller than the predetermined charging current value after gradually increasing the allowable upper limit value of the charging current, and wherein the discharge current limiting part is configured to increase a size of increase of the allowable upper limit value of the discharge current when the detected value of the discharge current is smaller than the predetermined discharge current value after gradually increasing the allowable upper limit value of the discharge current.

19. The battery protection circuit as claimed in claim 17, wherein the charging current limiting part is configured to decrease the allowable upper limit value of the charging current when the detected value of the charging current is greater than the predetermined charging current value, and wherein the discharge current limiting part is configured to decrease the allowable upper limit value of the discharge current when the detected value of the discharge current is greater than the predetermined discharge current value.

20. The battery protection circuit as claimed in claim 19, wherein the charging current limiting part is configured to increase a size of decrease of the allowable upper limit value of the charging current when the detected value of the charging current is greater than the predetermined charging current value after gradually decreasing the allowable upper limit value of the charging current, and wherein the discharge current limiting part is configured to increase a size of decrease of the allowable upper limit value of the discharge current when the detected value of the discharge current is greater than the predetermined discharge current value after gradually decreasing the allowable upper limit value of the discharge current.

* * * * *